CALLING SUBSCRIBER IDENTIFICATION CIRCUIT

Filed Sept. 22, 1966 15 Sheets-Sheet 1

JAMES L. STEPAN
DOYLE V. CARMODY
JOHN S. WELCH
AHMET A. UNSEREN
INVENTORS

BY Delbert J. Warner
ATTORNEY

July 28, 1970 J. L. STEPAN ET AL 3,522,385

CALLING SUBSCRIBER IDENTIFICATION CIRCUIT

Filed Sept. 22, 1966 15 Sheets-Sheet 2

July 28, 1970 J. L. STEPAN ET AL 3,522,385

CALLING SUBSCRIBER IDENTIFICATION CIRCUIT

Filed Sept. 22, 1966 15 Sheets-Sheet 5

CALLING SUBSCRIBER IDENTIFICATION CIRCUIT

CALLING SUBSCRIBER IDENTIFICATION CIRCUIT

Filed Sept. 22, 1966 15 Sheets-Sheet 7

CALLING SUBSCRIBER IDENTIFICATION CIRCUIT

July 28, 1970 J. L. STEPAN ET AL 3,522,385

CALLING SUBSCRIBER IDENTIFICATION CIRCUIT

Filed Sept. 22, 1966 15 Sheets-Sheet 10

July 28, 1970 J. L. STEPAN ET AL 3,522,385

CALLING SUBSCRIBER IDENTIFICATION CIRCUIT

Filed Sept. 22, 1966 15 Sheets-Sheet 11

CALLING SUBSCRIBER IDENTIFICATION CIRCUIT

July 28, 1970 J. L. STEPAN ET AL 3,522,385

CALLING SUBSCRIBER IDENTIFICATION CIRCUIT

Filed Sept. 22, 1966 15 Sheets-Sheet 14

United States Patent Office
3,522,385
Patented July 28, 1970

3,522,385
CALLING SUBSCRIBER IDENTIFICATION CIRCUIT

James L. Stepan, Humboldt, and Doyle V. Carmody, John S. Welch, and Ahmet A. Unseren, Milan, Tenn., assignors to International Telephone and Telegraph Corporation, New York, N.Y., a corporation of Maryland Filed Sept. 22, 1966, Ser. No. 581,371
Int. Cl. H04q 3/72
U.S. Cl. 179—18 15 Claims

ABSTRACT OF THE DISCLOSURE

A calling subscriber identification system is provided for use with a toll center. The system employs a special trunk responsive to an incoming call for determining which line is calling. It provides a tone in response to a signal from the toll center indicating the toll center has accepted the call and is available to receive identifying signals. It then provides output signals which identify the caller to the toll center for toll purposes.

The present invention relates to the identification of a calling subscriber station in a telephone system, particularly so that toll charges may be assessed against the calling party by automatic toll determining equipment. More specifically, the invention may be described as relating to an end office identifier which sends the calling subscriber's directory number to a toll center.

In modern dial telephone systems, and particularly with the increased use of automatic equipment, as in direct long distance dialing, there is a need for facilities capable of assessing tolls against the correct party.

At the present time, in the United States, the bulk of all long distance calls pass through long lines controlled by the Bell System. This System incorporates toll determining equipment (such as that called CAMA for "Centralized Automatic Message Accounting") which has proven satisfactory for that System when it uses its own equipment. However, when independent telephone companies connect into the Bell System long lines equipment, compatibility requires the independents to provide essentially the same type of CAMA identification. In many cases, compatibility has been difficult to achieve so that the independents have required the service of an operator even where direct dialing would otherwise be feasible.

Thus, a primary object of the present invention is to provide means for automatically supplying the telephone number of a calling party to toll determining equipment and more particularly to provide identification which is compatible with CAMA equipment.

It is a further object of this invention to provide improved supervision over sleeve circuits to a subscriber identifier circuit.

The foregoing objects and others ancillary thereto may be attained by an identifier which provides the required subscriber identification in the following way. Assuming a demand for service has been extended from a subscriber through an outgoing trunk to a toll center, then the outgoing trunk on an off-hook signal received from the toll center (CAMA center) requests a number to identify the calling subscriber from the identifier. The identifier acknowledges the demand and starts a sequencer. The sequencer sequentially reads the calling number from an identification matrix and drives an MF Sender, or Multi-Frequency Sender, which in turn sends the identification digits to the toll center via the outgoing trunk. Embodiments of a preferred electronic identification unit operate on either a terminal per line basis (TPL), a terminal per station basis (TPS) or a combination of both. It identifies one number at a time.

The invention uses this principle of operation. An AC signal or tone is transmitted over the sleeve of the switch train and detected at the line entrances to the central office equipment through use of a matrix and electronic detectors. The unit may be equipped with an optional standby power supply and an AC signal generator which will automatically cut into service if required. Suitable alarms and checking features are built into the system to insure reliable operation and easy maintenance.

The novel features characteristic of this invention are set forth with particularity in the appended claims. The invention itself, however, both as to its organization and its method of operation together with additional objects and advantages thereof, will best be understood from the following description of specific embodiments when read in connection with the accompanying drawings, in which:

FIG. 5A shows how FIGS. 5 and 6 may be joined;

BRIEF SYSTEM DESCRIPTION

Figure 1:
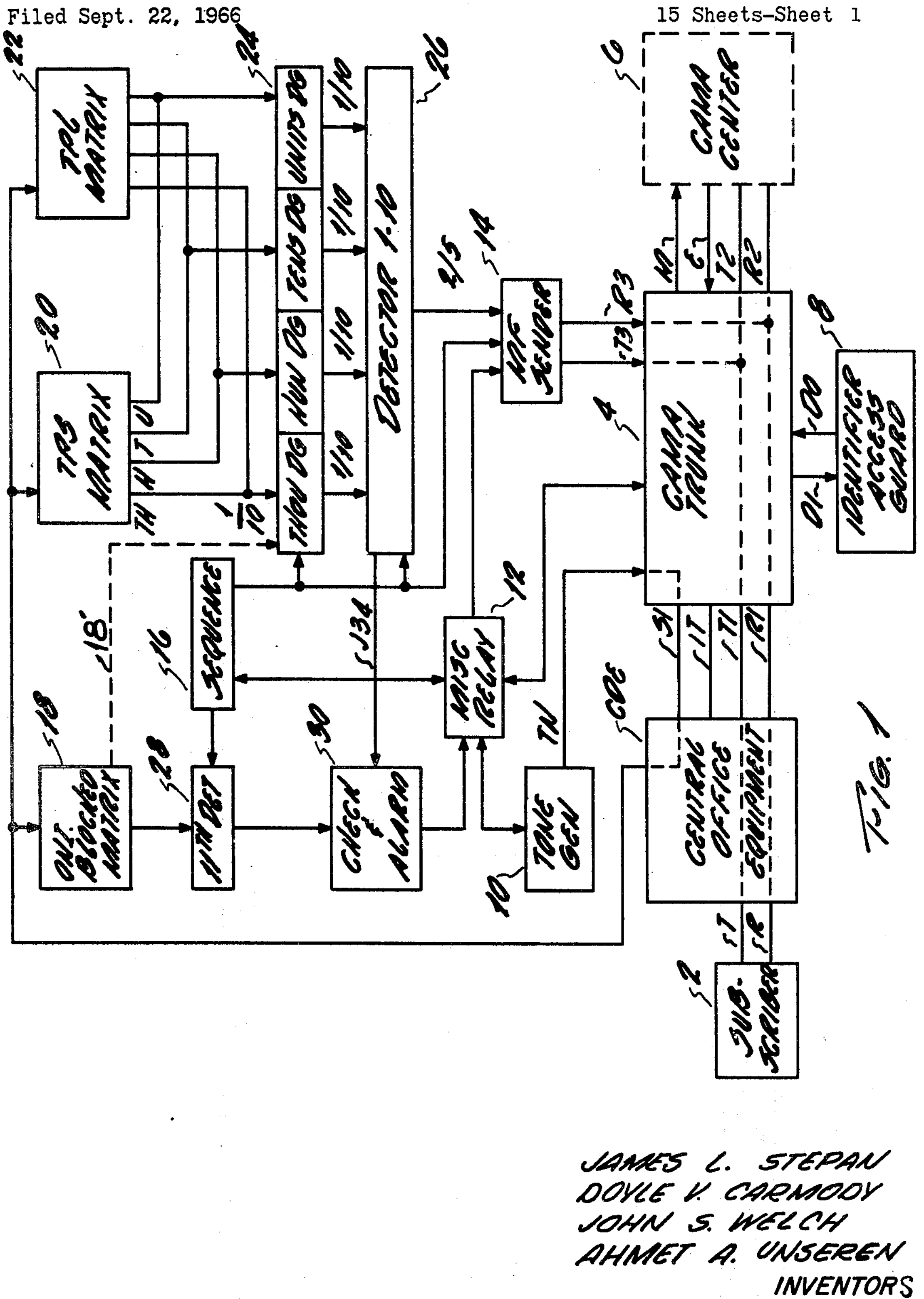
FIG. 1 is a block diagram depicting an arrangement of a system according to the invention.

Turn first to FIG. 1 for a general description of the invention. When the subscriber station 2 goes off-hook, it is connected through tip and ring conductors T and R to the central office equipment (COE). Dial tone is returned if the system is available for calls. If a toll ticketing type of call is being placed, the subscriber then dials an access code including a circle digit (party identification digit), if this scheme of party identification is being used. The trunk circuit 4 is seized over the central office loop, including tip and ring conductors T1 and R1, usually from a selector level. Ground is returned on the sleeve lead S1 and the CAMA toll center 6 is seized over the M lead in the case of E and M trunks and by outgoing loop including tip and ring T2 and R2 on loop trunks.

The subscriber then dials the area code and the called subscriber's number. When this is complete, answer supervision is returned from the toll center either on the E lead if E & M signalling is used or by loop battery reversal if loop trunks are used.

On receiving answer supervision as described above, the CAMA trunk circuit 4 extends a demand in signal DI into inlet of the identifier access guard circuit 8. If no other CAMA trunk circuits are accessing the identifier at this time, a demand out signal (DO) is returned to the trunk circuit 4, thereby allowing it to access the identifier.

When the CAMA trunk circuit 4 has been connected to the identifier, the subscriber's sleeve lead S1 is extended into the identifier where it is connected to the tone generator 10. The sleeve lead S1 (previously extended to the tone generator 10 via the CAMA trunk circuit 4) is also terminated on the matrices 18, 20, or 22. The location at which the sleeve terminates in the various matrices corresponds to the subscriber's number.

The party digit is transferred to the miscellaneous relay circuit 12, and the trunk tip and ring conductors T3 and R3 are extended to the output of the MF sender 14. When the miscellaneous relay circuit 12 is accessed, a start signal is given to the sequencer 16. Responsive thereto, the sequencer will run through its cycle of operation. The control of the identification read is thereby given to the sequencer.

In its first function, the sequencer enables the thousands digit gate (gate 24). A particular bus leading from one of the matrices will then have a tone applied to it which, when gated through block 24 into the detectors 26, will determine the class of call, e.g. ONI (operator number identification), ANI (automatic number identification), etc. For an ONI call, the calling subscriber line is connected to an operator position. For example, a paystation requires ONI service. The operator talks to the subscriber, ascertains his identity, and then performs some act (such as dialing or keying) to store numbers identifying the calling subscriber to the toll ticketing equipment or to see to it that proper billing procedures are followed. In an ANI call, automatic equipment performs the same function without requiring human intervention.

If the call is "ANI" (automatic number identification), one of the ten detectors in block 26 is operated. Then the sequencer gates the MF sender 14 and causes it to send out a "KP" signal (key pulse or start pulse). Next the MF sender 14 sends the digit "0" followed by the first three or "A", "B", and "C" digits of the office code, then the thousands, hundreds, tens, and units digits and finally the "ST" (terminating) signal. These signals, which correspond to the matrix output are transmitted from the trunk to the toll center via the tip and ring leads T2 and R2.

If there is an identifier failure, no tone is present in the matrix and no detectors operate. The MF sender 14 then sends out the "KP" signal, the digit "2" and the "ST" signal. Again, these signals are transmitted from the trunk to the toll center via the tip and ring leads.

If the call is ONI (operator number identification), the subscriber who is to be assigned ONI service has a sleeve conductor S1 connected to the ONI blocked matrix 18 rather than to one of the number identification matrices, 20 or 22. The identification tone which is applied to the sleeve then appears only on the ONI blocked matrix 18 which activates the 11th detector 28, i.e. the ONI class of call detector. In response to such an activation of the 11th detector, the MF sender 14 sends out the "KP" signal, the digit "1" and the "ST" signals from the CAMA trunk circuit 4 to the toll center via the tip and ring conductors T2 and R2.

If a station (paystations, etc.) is equipped to have its call blocked from DDD (direct distance dialing) services, the sleeve conductor of the station is connected to one of the number identification matrices 20, 22 and to the ONI blocked matrix 18. The source 10 is connected to the sleeve S1, and the tone appears in both matrices 18 and 20 or 22. Hence, the 11th detector 28 and one of the ten detectors 26 operates for blocked calls. In this case, the MF sender 14 is inhibited so that it sends no data to the toll center and the trunk 4 is released.

On completion of the gating functions, the sequencer 16 resets and releases the miscellaneous relay circuit 12. The miscellaneous relay circuit 12, in turn, releases the CAMA trunk circuit 4 which tells the associated equipment that the calling subscriber identification is complete. The CAMA trunk circuit releases the identification access guard circuit 8, and cuts through the talk path (tip and ring conductors T1, R1, T2 and R2) from the subscriber station 2 to the CAMA center 6. In any well known manner, the CAMA center then completes the call and retains supervisory control of the trunk.

Figure 2:
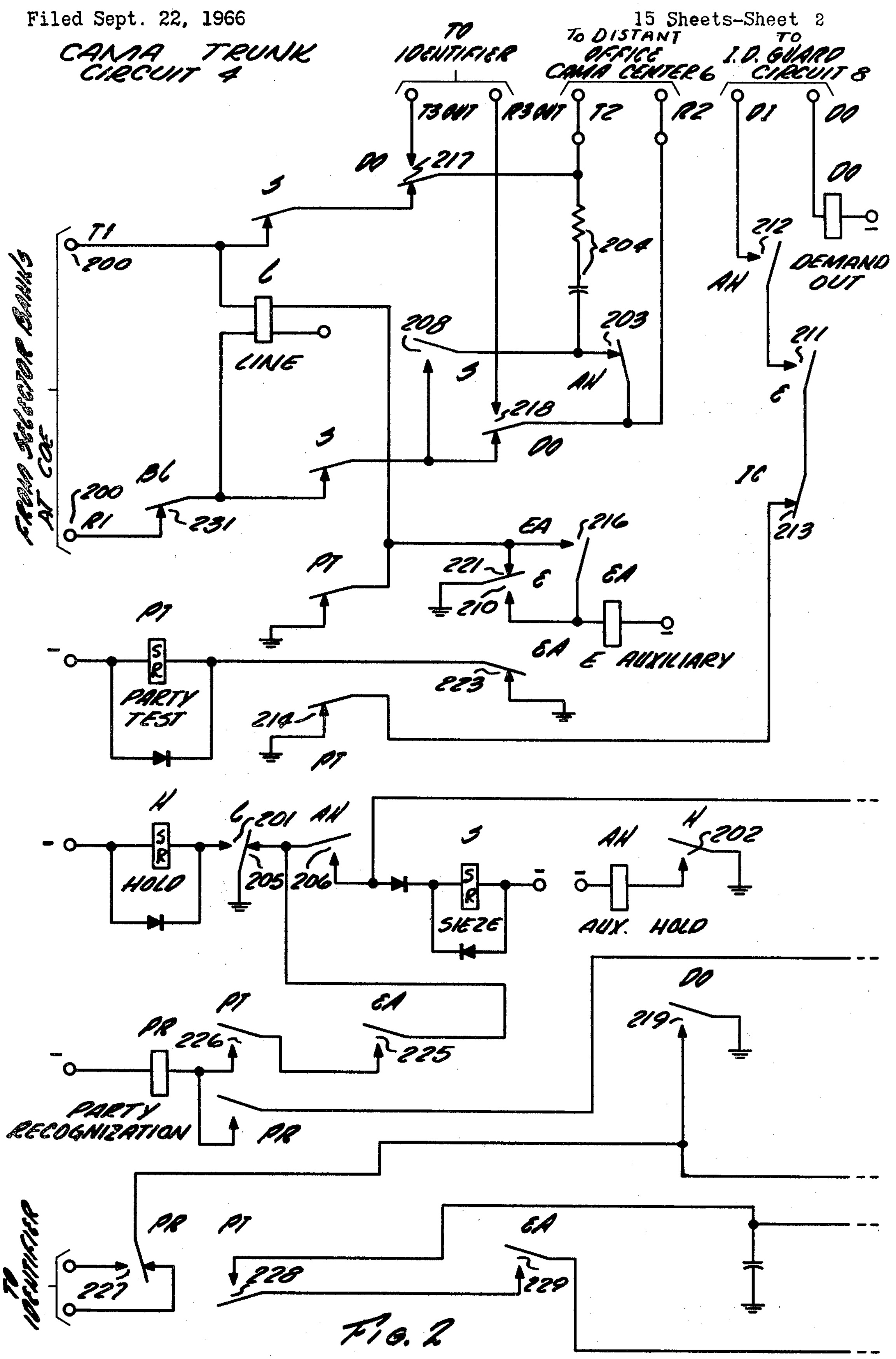
FIG. 2 and FIG. 3 are diagrams showing details of a preferred embodiment of a CAMA trunk circuit constructed according to the invention.
Figure 3:
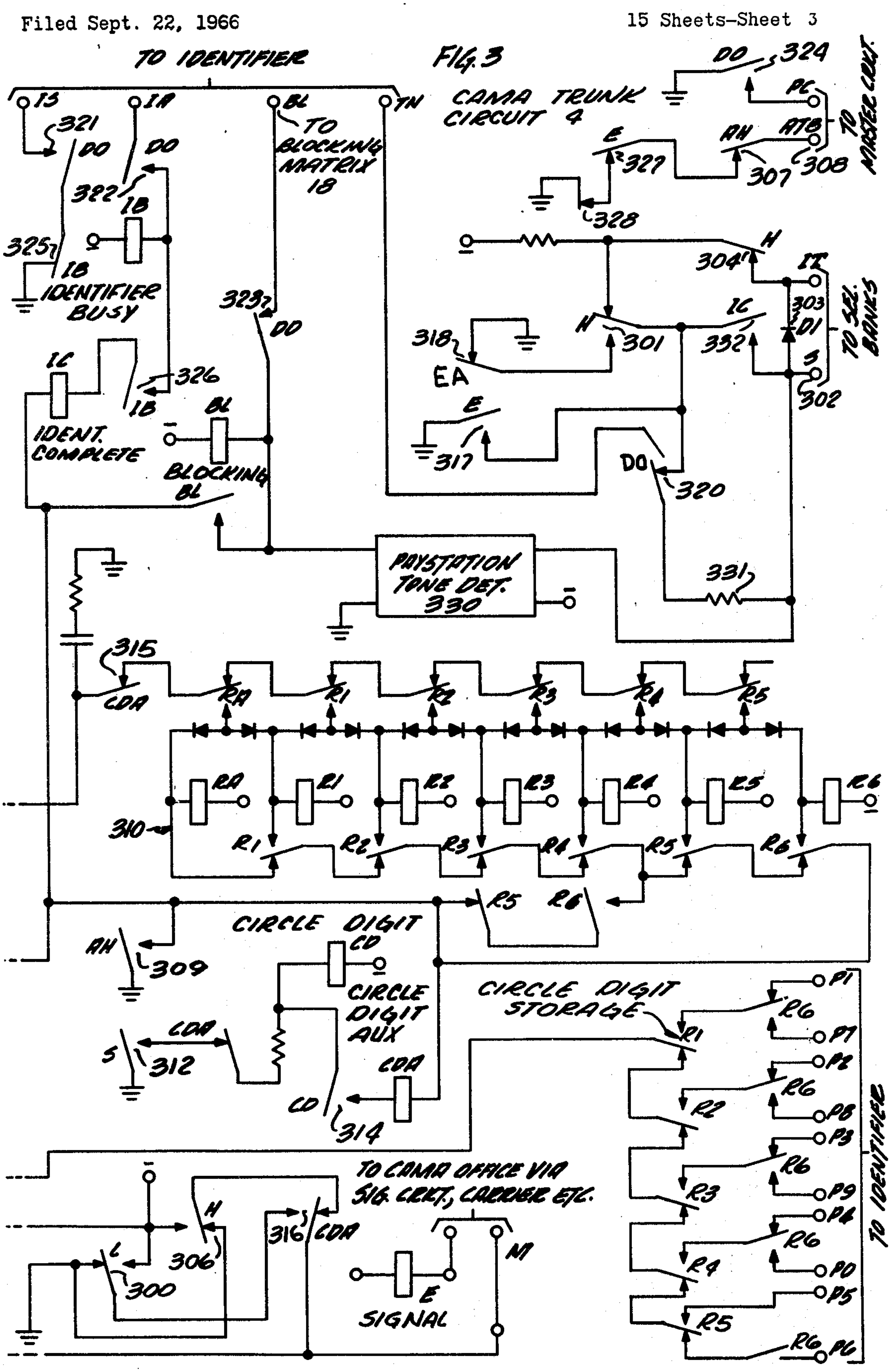

The CAMA trunk 4 (which is shown in detail in FIGS. 2 and 3) provides a tributary access to the CAMA equipment at center 6. The trunk is one-way outgoing, and it enables the number identification to the sender. It repeats the subscriber dialled digits, and it provides a transmission path with a balanced battery feed. It can also provide circle digit identification for a number of parties, two party identification, storage for a party digit, and paystation restriction, if needed.

To aid the reader, the hundreds digit of the following reference numerals identify the figure where the component may be found. For example, a component 200 is in FIG. 2 and a component 300 is in FIG. 3.

CAMA TRUNK CIRCUIT

Seizure of the trunk is accomplished when the central office equipment COE connects the subscribers loop 200 conductors T1, R1 to the line relay L. The line relay L follows the subscriber sent dial pulses and repeats digits at 300 to an "M" lead. The L relay also operates a hold relay H via contact 201. The hold relay H remains operated during dial pulses.

Relay H operates its contacts 301 which places ground on the S lead 302 and also applies ground through the D1 diode 303 to the IT lead to give an immediate busy and prevent a possible double seizure. Upon first being operated, relay H opens contacts 304 to remove battery from the IT lead, closes contacts 202 to apply ground to the AH relay, and contacts 306 to apply battery to the "M" lead. The AH, or auxiliary hold, relay is slave to the H relay. On operation, it opens contacts 203 to remove the idle line termination 204 from the trunk 200. Contacts 307 open to remove the ground from the ATB (All Trunks Busy) lead 308, and contacts 309 close to apply a ground to the counting chain 310—which operates the RA relay to prepare the counting chain for the first digit dialled.

On the break portion of the first pulse, the L relay releases contacts extending ground through an AH contact 206 to operate the seize relay S. Relay S operates and holds itself (owing to its slow release characteristics) during reception of the dial pulses. Sleeve relay contacts 312 extend ground to the circle digit CD relay in preparation for storage of a circle digit. Contacts 208 close to connect termination circuit 204 across the CAMA trunk conductors 200.

The counting circuit 310 (relays RA, R1, R2 . . . R6) counts the number of dial pulses received in the first digit (circle digit). At the termination of the pulses forming the first digit, the line relay L stays in the operated position. After contacts 205 have been open for a period which is longer than the release time of relay S, it releases. Upon releasing, its contacts 312 remove ground from the CD relay. At this time, the circle digit slave relay CDA operates in series with relay CD and via contacts 314, 309. On operating, CDA opens contacts 315 and thus transfers control of the "M" lead to the L relay contacts 300 for repeating the remaining digits which are to be dialled by the calling subscriber. After the subscriber finishes dialling, the CAMA center 6 returns off-hook supervision in the form of a ground on the E lead, thus indicating its readiness to receive the calling party identification. The off-hook ground signal operates the E relay. The E relay operates contacts 210 and extends ground to operate the E auxiliary or EA relay. Contacts 317 ground the S-lead 302 and contacts 211 puts a "demand in" signal (DI) to the identifier guard circuit 8 (FIG. 4) via contacts 212, 211, 213, 214. Contacts 318 are redundant to contacts 317 and are provided to keep ground on the sleeve during relay transition periods. If the guard circuit 8 is idle, ground is returned on the "demand out" (DO) lead which operates the DO relay. At contacts 320, the DO relay transfers control of the S-lead 302 to the identifier and closes a circuit to the tone lead TN. This tone is the A.C. signal fed out over the sleeve 302 to enable identification. Relay EA locks through the L relay winding and its own contacts 216. Relay DO operates its contacts 217, 218 and extends the T3 and R3 out conductors to the CAMA center 6. Contacts 321, 322, 323 extend the IA, IS leads and contacts 219 energize P1, P2 . . . P0 leads which sends the digit stored in the chain 310 to the identifier. Contacts 324 apply ground to the well known peg count lead PC.

The identifier returns ground on the IA lead, operating the identifier busy or IB relay via contacts 322. Relay IB, operating contacts 325, removes ground from the IS lead. After the identification is complete, the identifier removes the ground from the IA lead, and the identifier complete or IC relay operates in series with relay IB over a circuit traced from battery through the winding relay IB contacts 326, the winding of relay IC and contacts 309 to ground. The IC relay, on operating contacts 213, removes ground from DI lead, which releases the guard circuit 8 and, in turn, the DO relay. The DO relay releases and cuts through the transmission path from the incoming line through contacts 217, 218 to the trunk line T2, R2 leading to the CAMA center 6.

The PT (party test) relay is used when two party identification is required. On the answer from toll center, the E relay operates and opens contacts 221 to remove ground from the tip side T1 of the line 200. If the calling subscriber station is the first party on line 200, the line L relay drops, and if it is the second party, the line relay remains operated. When the E relay operates during the party test, contacts 210 operate the EA relay. On operating, the EA relay opens contacts 223 in the holding path for the PT relay. The PT relay is slow to release. If during this release time, the L relay releases contacts 205, the PR (Party Recognition) relay operates via contacts 225, 226 and transfers contacts 227 which signals the identifier that the subscriber is the first party. During the release time of relay PT, battery is maintained on the "M" lead by PT and EA contacts 228, 229. On release of relay PT, contacts 214 close, and a demand is initiated via lead DI to the identifier guard circuit 8. The remaining operation continues as previously described.

Release of the circuits may occur in a variety of ways. If the subscriber goes on-hook, he will release the line relay L. When relay L releases, contacts 300 remove battery from the "M" lead. Contacts 201 open and the relay H contacts 202 then release relay AH. This, in turn, opens contacts 309 and releases the IB and IC relays. The "M" lead goes to ground and signals the CAMA center 6 of an on-hook condition. The center 6 replies and removes ground from the "E" lead. The E relay releases and removes ground from the sleeve or S-lead 302 by opening contacts 317 and releases relay EA by opening contacts 210. All operated relays return to normal.

Should congestion or circuit time-out be encountered in the CAMA center 6, ground will be removed from the E lead causing relay E to release and remove the holding ground from the sleeve or S-lead to drop the switch train. All relays will return to normal.

When the CAMA center has traffic congestion, it may preclude a selection of the trunk circuit 4. To do so, the CAMA center 6 applies ground to the E lead, operating the E relay. The E relay operates and closes contacts 317 to apply ground to the sleeve or S-lead 302 and thereby give a busy indication to the switching equipment. When the CAMA center returns to normal, it removes the E lead ground, and contacts 317 open to remove the busy sleeve marking at 302.

An ATB lead 308 is provided which, in the idle state, extends ground to the meter circuits. The ground is removed by operation of the E or AH relay contacts 307, 327 or busy key 328. A peg count lead (PC) is provided and is activated by operation of relay DO contacts 324 for the duration of the identifier access time, which in a preferred embodiment is approximately one second.

If the calling party dials a non-existing circle digit from a party line or the call originates from a coin telephone, the identifier returns ground over the Blocking or BL lead. The BL relay operates via contacts 323 and breaks the loop at contacts 231, which drops the switch train and causes the subscribed line circuit (not shown) to go into line lockout. The circuit returns to normal as described previously with respect to subscriber release.

Should the trunk be used without the identifier, paystation blocking is accomplished by the paystation tone detector 330. On seizure, a paystation tone is detected on the sleeve or S-lead 302. Then detector 330 extends ground to operate the BL relay, which drops the subscriber into line lockout. A resistor 331 provides a degree of isolation between the paystation tone from 330 and the tone lead TN. The contacts 332 by-pass the resistor 331 on occasions when the IC relay is operated.

ACCESS GUARD CIRCUIT

Figures 3A, 4, 8A:
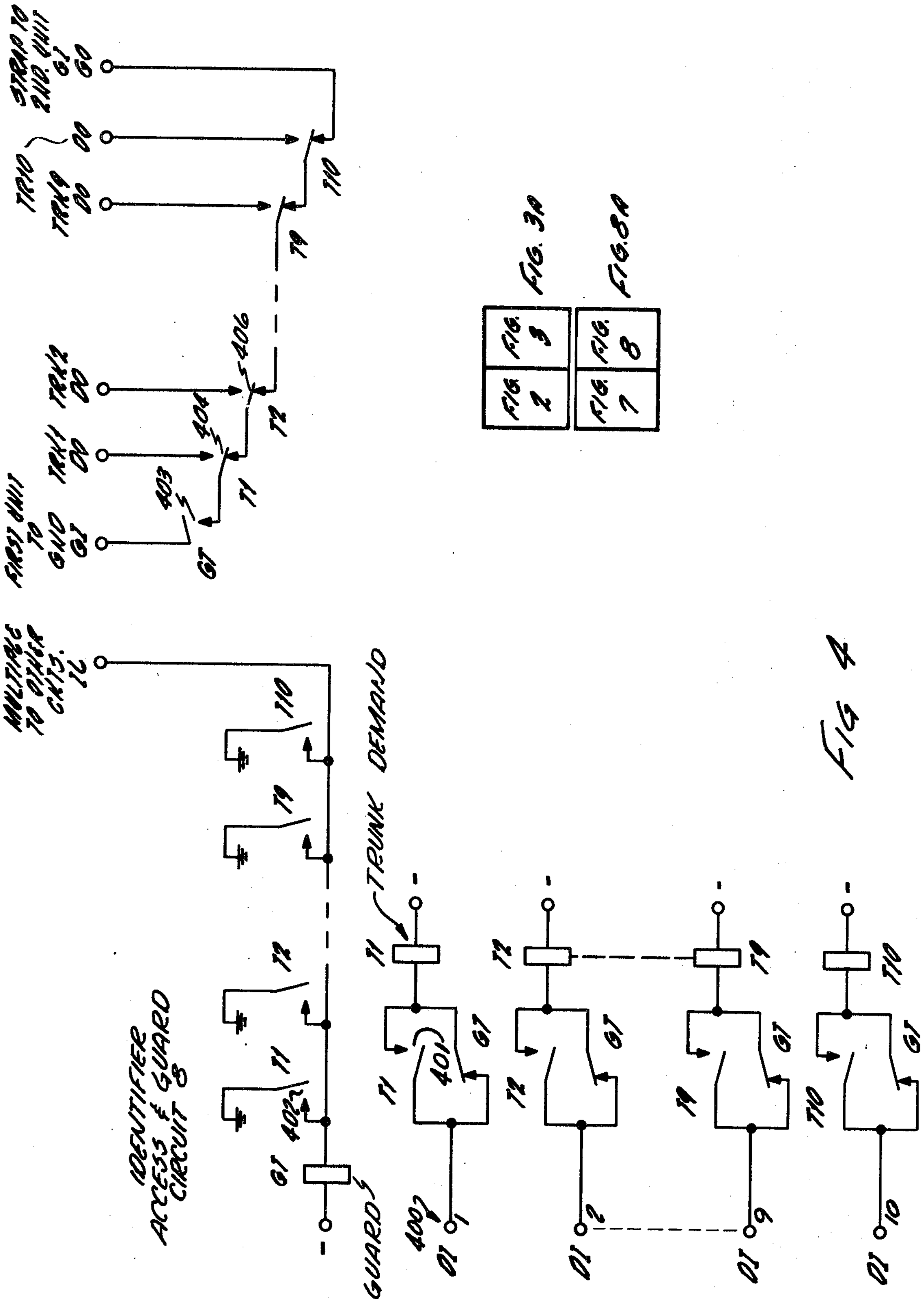
FIG. 3A is a block diagram showing how FIG. 2 and FIG. 3 may be combined.
FIG. 4 is a diagram showing an identifier access guard circuit for use with the CAMA trunks.
FIG. 8A is a block diagram showing how FIG. 7 and FIG. 8 should be combined for viewing.

The identifier access guard circuit 8 (FIG. 1) is shown in detail in FIG. 4. This circuit functions to provide an interlock which allows only one CAMA trunk 4 to gain access to the CAMA identifier at any given time. The trunk initiates a demand for the identifier by closing a path including the contacts 212, 211, 213, 214 for extending ground on the DI lead. By way of example, FIG. 4 shows ten DI leads at 400 which means that there are ten CAMA trunk circuits. If the guard trunk relay or GT relay is not operated, it means that the identifier is idle and available for seizure. The associated CAMA trunk circuit 4 closes a circuit to a T relay (T1, T2 . . . or T10) which identifies the trunk. For example, a "1" CAMA trunk circuit operates and locks relay T1 through its own contacts 401 to maintain a demand for the identifier until the subscriber has been identified.

On operate, the selected T relay (T1 in this example) closes its contacts 402 and applies ground to operate the GT relay. Relay GT operates its contacts 403 and extends ground from the GI lead through the operated T relay contacts 404 to the DO (or Demand Out) lead which extends to FIG. 2. Ground on the DO lead tells the CAMA trunk circuit 4 to call in the identifier. When identification is complete, the identifier signals the trunk circuit 4 which removes ground from the DI lead and the associated T relay releases. Contacts (such as 402) open for releasing the GT relay.

In the event of a simultaneous seizure from more than one CAMA trunk circuit 4, all of the associated T relays operate. Ground is extended through each operated one of the contacts, such as 402, to operate the GT relay. On operating, relay GT extends the GI lead to the lowest order contacts on a preference chain to the first demanding DO lead. For example, if both of the relays T1, T2 are operated, the contacts 404 operate to prevent the GI ground from reaching trunk "2" via contacts 406. Thus, the trunks are serviced low order first (i.e. the lowest numbered, operated T relay seizes the identifier for its trunk) until all trunks are served. Upon release of the last T relay, the GT relay releases, and the identifier is again available to serve any waiting demands.

NUMBER IDENTIFICATION MATRIX

As normally supplied, the identifier includes two basic and independent matrices. One forms an automatic number identification (ANI) matrix, and the other forms an operator number identification and blocked matrix (ONI). The number identification matrix which makes up the bulk of the identifier includes two varieties, a terminal per line matrix (TPL) 22 and a terminal per station matrix (TPS) 20.

When the identifier is to work into a CAMA center 6, it is necessary to have a matrix which is capable of accommodating all subscriber numbers that can access the identifier. To do this, the central office sleeves go to the matrix inlets of the matrices 20 or 22 (FIG. 1), and the matrix outputs go to ten detectors 26 via four sets of digit gates 24.

Preferably, the number identification matrices are made up of modular units. In a preferred embodiment, each unit consists of one shelf accommodating twenty-five TPL or TPS resistor matrix cards. Each card accommodates twenty subscribers, or a total of five hundred subscribers per shelf. The matrix may be expanded to a maximum of twenty shelves per office code or ten thousand lines. It is possible to mix shelves of TPL and TPS matrix schemes in the same number identification matrix; however, care must be taken that there is no TPL or TPS number split in the same "thousands number group." In any event, the number identification matrix should never consist of more than twenty shelves of matrix cards for a particular office code.

The terminal per line matrix or TPL matrix scheme provides termination for TPL subscribers. The TPL matrix (shown as block 22, FIG. 1) is a pure resistor matrix consisting of four resistors per directory number mounted on a 4½ x 8 inch printed circuit card.

The terminal per station matrix or TPS matrix scheme provides termination for TPS subscribers. The TPS matrix (shown as block 20, FIG. 1) is a diode-resistor matrix consisting of five resistors and two diodes, per number, mounted on a 4½ x 8 inches printed circuit card. Associated with each TPS matrix shelf is a party patch panel (not shown) which provides a method of identifying a particular one subscriber when more than one subscriber is connected to a line and an identifying number, per sleeve, is extracted from the matrix. In this case, the single sleeve has multiple terminations at the inputs of the matrix, respective ones of the terminations corresponding to each party line subscriber number. In the normal state, each matrix input is prevented from being gated to the detectors. Each subscriber will be assigned a party identification digit which must be determined by some type of party identification scheme, i.e. circle digit or tip ground, etc. This digit is first stored in the trunk and then transferred to the identifier during identification to unlock the matrix for that particular subscriber's number.

Figure 5:
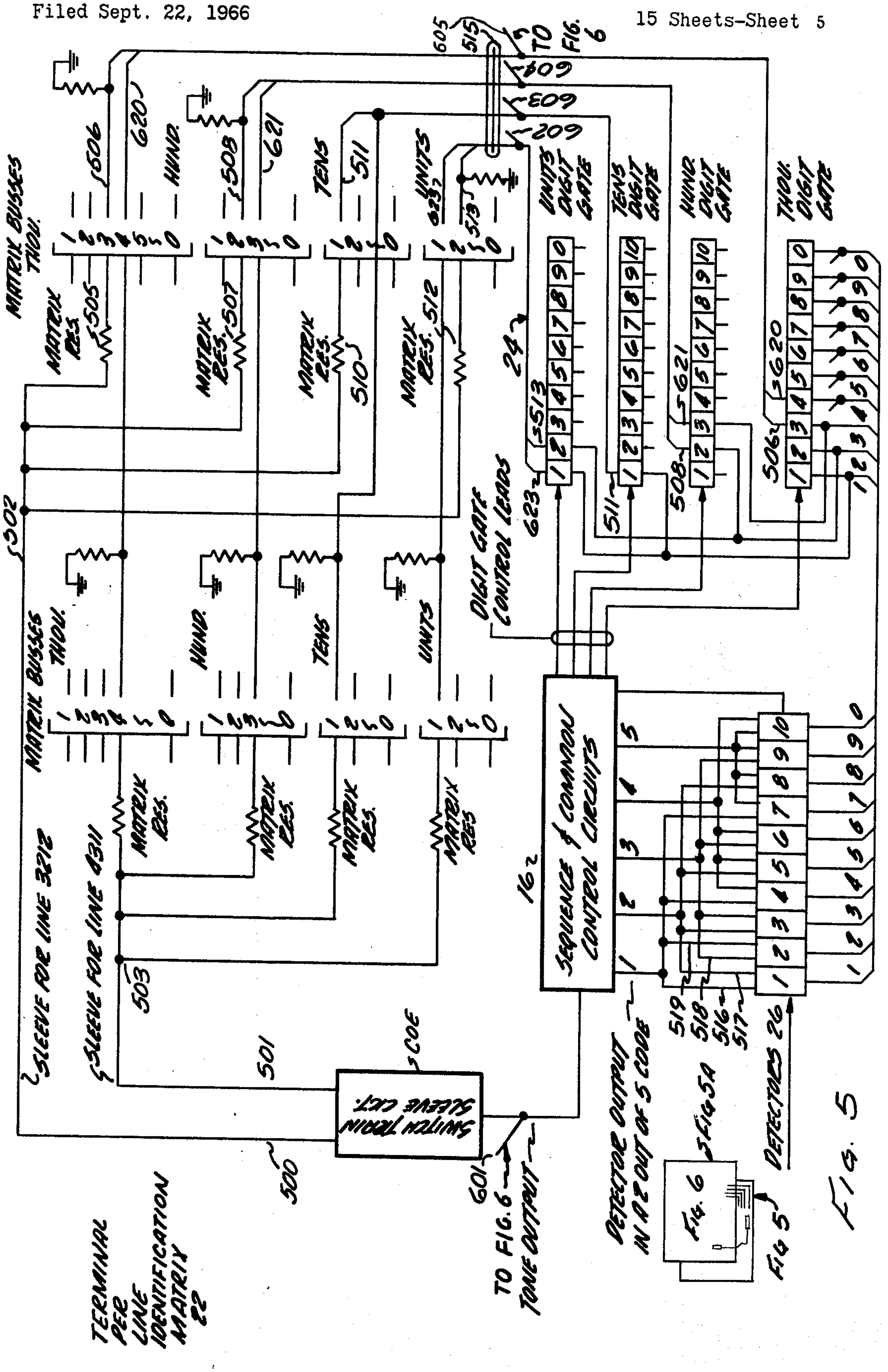
FIG. 5 and FIG. 6 show details of TPL and TPS identification matrices and their relationship to the circuits.

Turn now to FIG. 5 for additional details relating to the TPL matrix 22. Each sleeve (such as 500, 501) from the central office equipment (COE) is terminated on the TPL matrix at an inlet (such as 502, 503) representing the subscriber directory number. Each of these numbers is represented by four resistors that are connected from the associated inlet to the matrix busses that represent the thousands, hundreds, tens and units digits. Take, for example, sleeve 500 assigned to the subscriber identified by the directory number 3212. As shown in FIG. 5, one resistor 505 terminates on the "3" thousand matrix bus 506, one 507 on the "2" hundred matrix bus 508, one 510 on the "1" ten matrix bus 511, and one 512 on the "2" unit matrix bus 513. The resistor matrix connections for directory number "4311" should now be apparent from an inspection of FIG. 5. The busses are formed by the matrix shelf and bay cables.

In keeping with one aspect of the invention, an A.C. tone is used for identifying the appropriate number in the matrix 22. In greater detail, when an approximately 60 volts, peak-to-peak, A.C. signal (tone) is applied to a sleeve, such as 500 or 501, in a typical embodiment of the invention, it will appear on only four, such as 506, 508, 511, 513, of the possible forty busses 515. The A.C. tone signal will, in the usual case, be attenuated by a factor of about 1000 due to the matrix voltage divider action. Thus, the tone appears as a 60 millivolt (approximately) signal at each of the connected digit gates 24. If an appropriate gate group is closed, the 60 millivolt signal activates the associated detector 26 which, in turn, marks out the correspond digit in a 2-out-of-5 code. For example, the digit "1" marks the detector outputs 516, 517 which lead to "1" and "2", the digit "2" marks the outputs 518, 519 which lead to 3 and 1. The remaining decimal to two-out-of-five conversions should be apparent from a study of FIG. 5. In the case of sleeve 500 (Directory No. 3212) in FIG. 5, if the thousands gate group is operated, the A.C. tone signal is fed over conductor 506 to only the No. 3 detector; likewise for the hundreds gate group only the No. 2 detector is activated.

When the CAMA trunk circuit 4 accesses the identifier, the A.C. tone is superimposed on the sleeve of the calling subscriber. The sequencer 16 then gates the four directory number digits (thousands, hundreds, tens and units) one at a time to the detectors where they are converted into a 2-out-of-5 code. Responsive thereto, the multi-frequency sender 14 sends two of five tones to the CAMA center 6.

Figure 6:
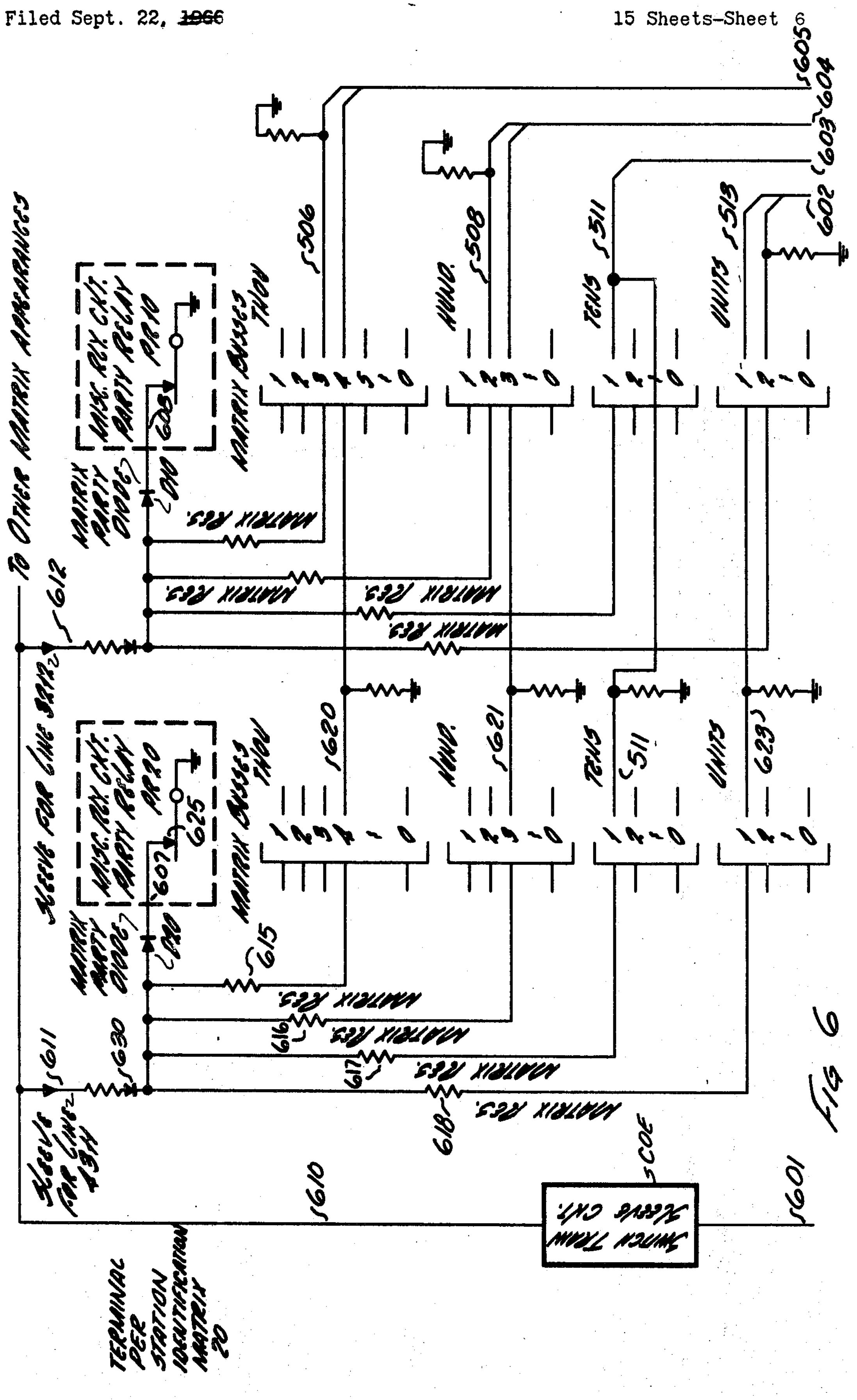

According to another aspect of the invention, means are provided for inhibiting the identification of all party line subscribers except one, thereby allowing the identity of that one line to be read out responsive to an application of an A.C. tone signal to the matrix 20. Then, the inhibit is reapplied to that one party line identification and removed from another, the process being repeated until all party line subscribers have been scanned for identification. At some instant in the scan, every line has an opportunity to be identified. If it is so identified, the equipment knows which party is making the call. For a better understanding of how this may be accomplished, reference may be made to FIG. 6 which discloses an exemplary TPS matrix 20, that resembles closely the TPL matrix 22 and connects into the lower half of FIG. 5. The connections are made between the corresponding wires marked 601–605 in each of the FIGS. 5 and 6.

Each sleeve entrance to the TPS matrix has as many appearances in the matrix as there are parties associated with that line. The matrix 20 is then arranged to identify any number up to ten parties on a line. This then implies that for a full ten party line, the A.C. tone appears at ten different points in the matrix when tone is fed onto the sleeve. For the identifier to identify one number out of ten, it is necessary to inhibit the other nine matrix inlets (for a full ten party line). This is accomplished by the selective connections through matrix party diodes and the selective operations of the party relays PR in the miscellaneous relay circuit.

Each subscriber station on a multi-party line is assigned a different party digit over and above its directory number according to any known numbering plan. When the subscriber makes a call involving the TPS identifier, the party digit must be detected by some sort of a party identification scheme—such as a circle digit where the subscriber dials his own party digit, or a tip ground detection where the trunk determines the party digit automatically.

The party patch field in the TPS matrix 20 is equipped with ten output party busses such as 607, 608, each bus being designated as a particular party digit. Each subscriber's number has its matrix party diode D10, D11 . . . D20, D21 . . . DNN connected to its proper party bus. For example, sleeve 610 may serve ten parties two of which have the directory numbers "4311," "3212," as identified by matrix inlets 611, 612 and associated with the diodes D20, D10. By way of further example, the inlet 611, representing the directory number "4311," is coupled through resistors 615, 616, 617, 618 to the number busses 620, 621, 511, 623 which represent the thousands, hundreds, tens, and units digits "4," "3," "1," "1" respectively. An inspection of the drawing will disclose how the inlet 612 is connected to identify the directory number "3212."

Each party bus is normally grounded by its party-relay in the miscellaneous relay circuit. Now if the A.C. identification tone is fed into the matrix 20, the party diodes (D20, for inlet 611) short out the signal and hence virtually no signal is evident at the outlets of the matrix. The resistors (e.g. 615), which are used to store memories of the directory numbers act as a load for the tone generator (10, FIG. 1) used to apply an A.C. tone signal to sleeve 610. Thus, the party diodes (e.g. D20) do not place a dead short across the generator.

During detection, the CAMA trunk circuit 4 passes the party digit into the identifier to operate a proper party relay, say party relay PR20 (not shown), thereby opening the contacts 625. Thus, when the party relay PR20 operates and removes the ground at contacts 625 from party bus 607, the inlet 611 is no longer inhibited but is free to be read out. This frees all of the subscribers connected to party bus No. "1" for identification. However, only one party "1" subscriber will have tone on its inlet to the matrix field and hence its number will be detected. Viewed in a slightly different manner, the identifier has an opportunity to identify every subscriber in the entire office who is represented by the relay PR20, there being one such subscriber on each equipped party line. The identity which is read out during this opportunity is that of a particular line which is marked by an A.C. tone on its sleeve.

Means are provided for tending to make the resistor matrix 20 into a unidirectional device. Inherently, a resistor is a bidirectional device capable of passing the A.C. tone signal in either of two directions. Thus, when tone is applied from a single sleeve 610 to two matrix inlets 611, 612, there could be a sufficiently higher feed to constitute an offensive sneak feedback within the matrix which might cause a false identification. To preclude such an offensive sneak feedback the A.C. tone is supplied through each of the inlets via an isolating diode such as 630. This diode clips the negative half-cycles and prevents any feedback from inlet 611 to inlet 612.

The A.C. tone is applied to only one sleeve in the office at any given time. There is only one party recognition relay PR in an operated condition at any given time. All of the remaining party diodes are inhibited by being clamped to ground via unoperated party recognition relays PR. The matrix resistors attenuate the tone passing through them. This combination of an isolated matrix inlet, the selective sleeve input, the ground clamped inhibitions, and the matrix attenuation combine to, in effect, convert the bi-directional resistor matrix into a unidirectional matrix, all at a cost of only one diode per matrix inlet.

The ONI blocked matrix 18 consists of TPL matrix cards of the type disclosed in FIG. 5. These cards are mounted in a special card position—one card per number identification matrix shelf. Each card provides an automatic identification restriction for up to twenty subscribers. The input is over a sleeve lead and the output is wired to the 11th detector 28 (FIG. 1) for processing the call as an operator number identification (ONI) call. However, in a preferred embodiment, each identifier may be wired for the option that all subscriber inlets may be handled on a blocked call basis, and every call may be forwarded to an operator position for identification. The wiring options are also flexible to the extent that each ONI card may be corrected to afford ONI service for say ten subscribers and blocked handling for the remaining ten subscribers (i.e. a blocked call cannot be made so that no identification (automatic or operator), is required). When the blocked call option is exercised, a second output from the ONI blocked matrix is connected to detector 10, as shown by the dotted line 18' in the block diagram of FIG. 1.

On the basis of a full matrix system of twenty shelves, the ONI and the blocked matrix would consist of twenty cards or four-hundred subscriber numbers. If the ONI blocked matrix must have a capacity which is greater than twenty numbers per shelf, an ONI blocked matrix shelf is used. This shelf is identical to the TPL matrix shelf.

BRIEF DESCRIPTION OF SEQUENCER AND DETECTOR

A further feature of the invention provides a detector for the A.C. tone signal transmitted through any of the matrices. The A.C. detector reads out one digit at a time under the control of the sequencer. In greater detail, the detector circuit 26 (FIG. 1) is a half-wave synchronized integrating unit. A reference signal is fed from the tone circuit into the detector to synchronize the detection of a small A.C. signal as it appears at the matrix outlet busses. During such detection, the reference signal is gated into an integrating circuit under the control of the small A.C. signal received from the matrix. After an integration of 15 milliseconds, the electrical level in the integrator biases a transistor into conduction. Responsive thereto, two glass reed relays operate and furnish the 2-out-of-5 code translation and other supervisory signals.

In order to maintain the proper integration time, the detector may be adjusted for different signal levels encountered in exchanges of various sizes and to fit other differing conditions. During "no-detect" periods, a continuous reset (RS) signal is fed from the detector reset relays into the detector, which signal has the effect of emptying and inhibiting the integrator. These relays are normally operated from a detector reset lead (DRL) in the sequencer.

When a tone is gated from any matrix into the detectors 1–10 (26, FIG. 1), they provide a 2-out-of-5 DC output signal corresponding to the decimal equivalent of the individual detector. The 11th detector 28 (FIG. 1) is used to detect the output of the ONI blocked matrix and to extend information to the check and alarm circuit. This 11th detector is identical to any one of the detectors 1–10 in the block 26.

SEQUENCER

Figure 9:
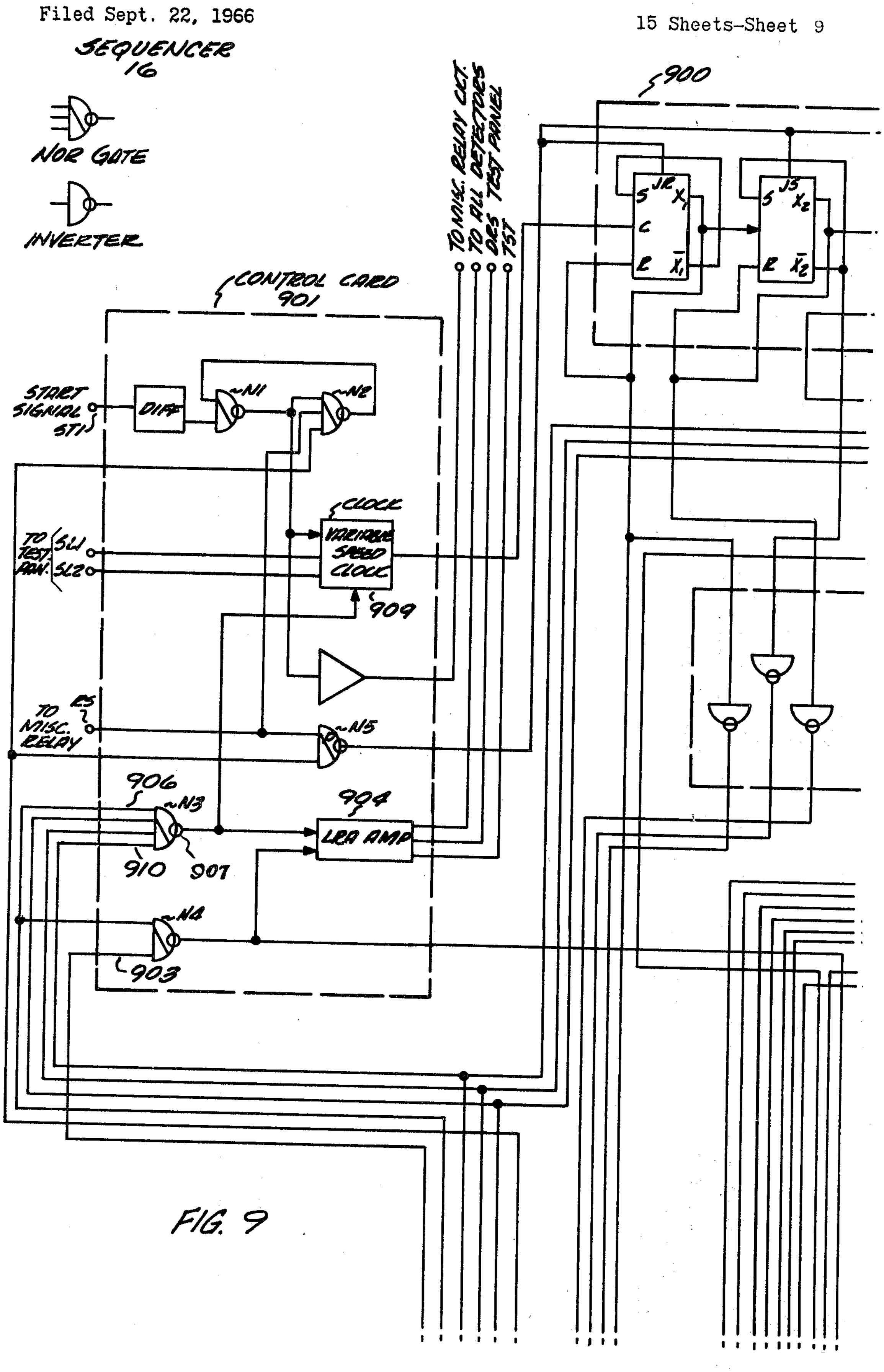
FIGS. 9, 10 and 11 (when joined together) are a schematic circuit diagram which shows the relationships between parts of the sequencer.
Figures 10, 13:
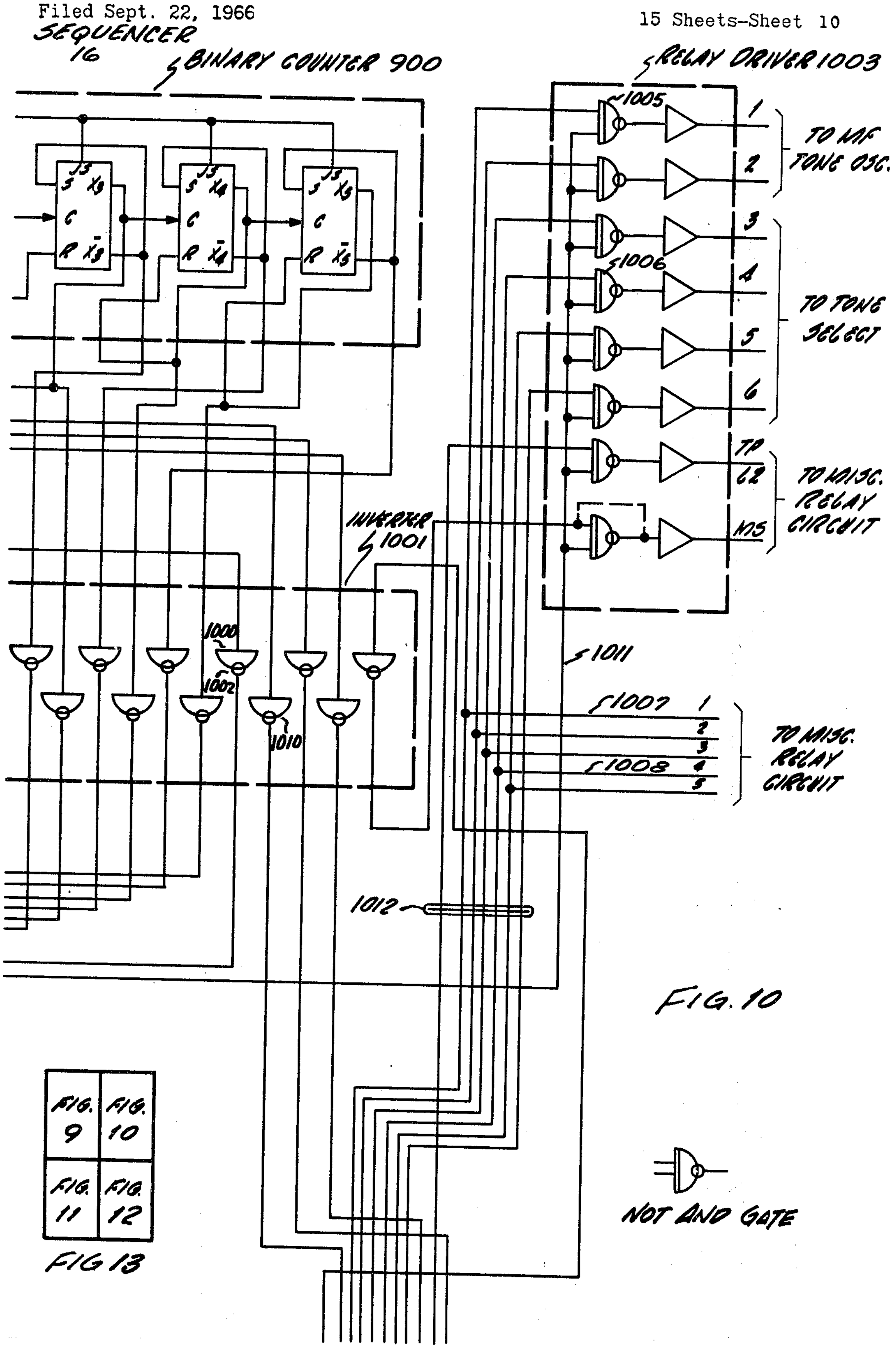
FIG. 13 is a block diagram showing how FIGS. 9, 10, 11 and 12 may be positioned with respect to each other.
Figure 11:
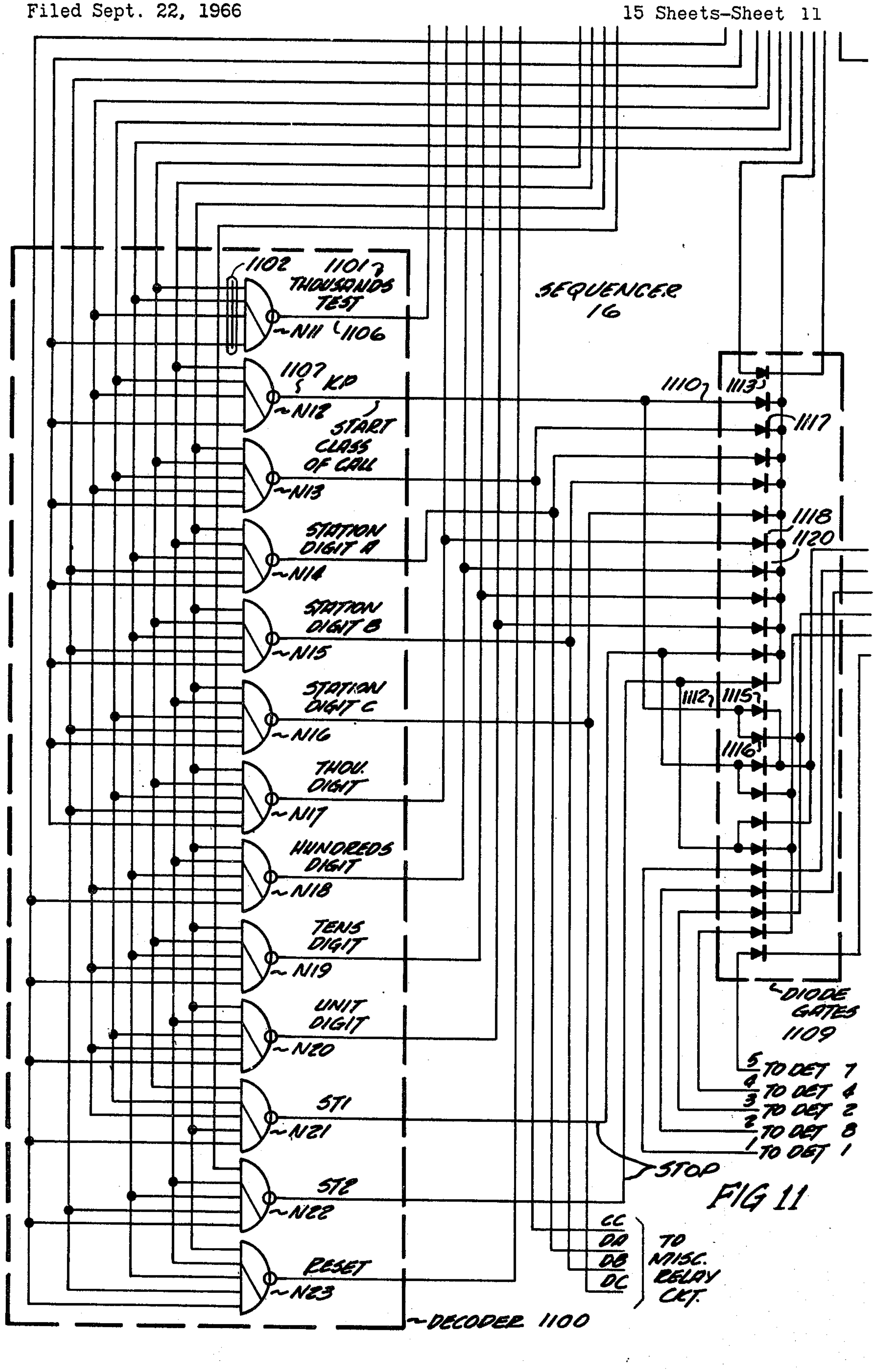
Figure 12:
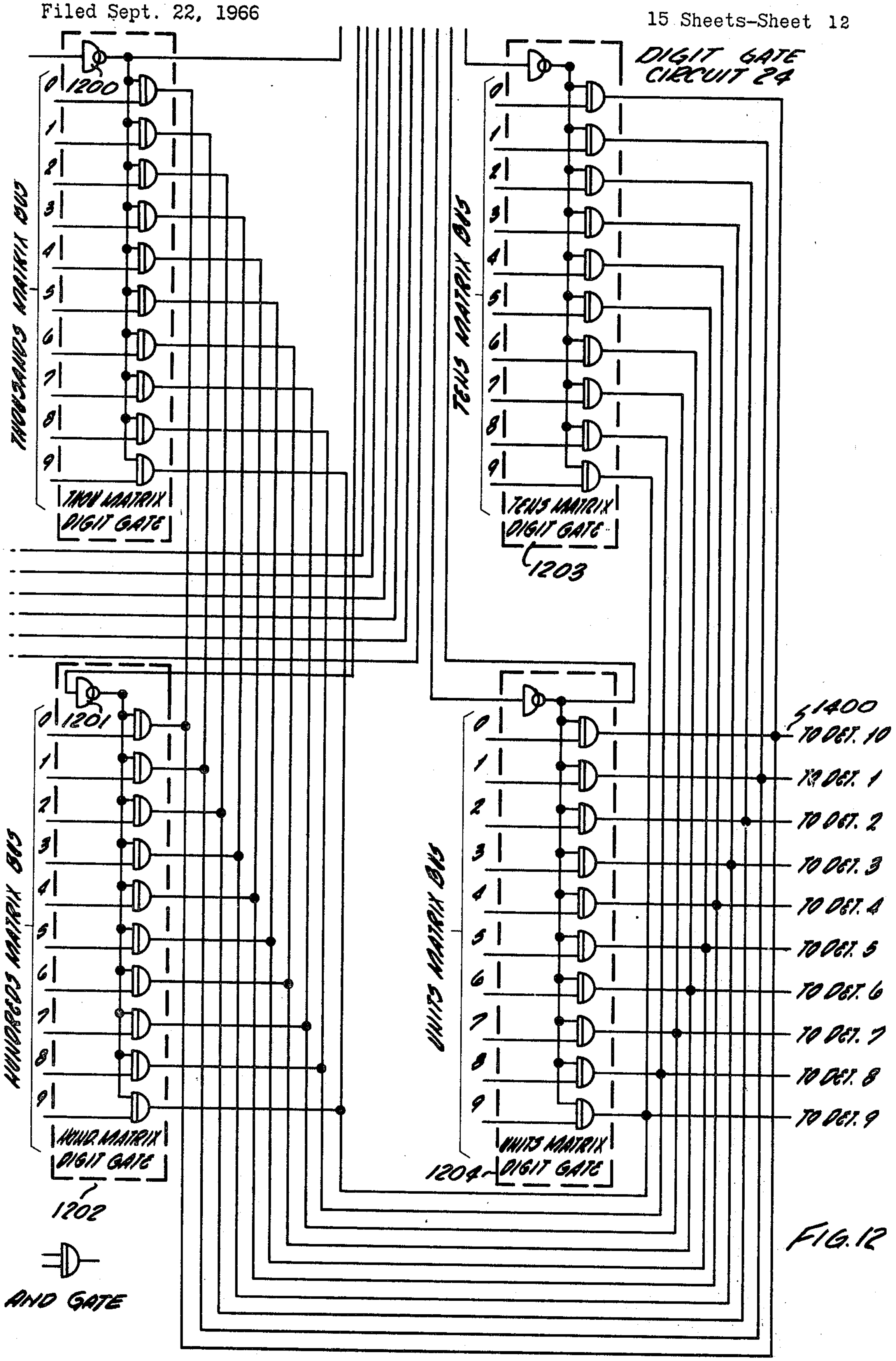
FIG. 12 is a diagram of a preferred arrangement of the matrix digit gates.

The sequencer (16 of FIG. 1) is shown in detail in FIGS. 9, 10 and 11. FIG. 12 shows the digit gates and the relationship of the digit gates to the circuits of FIGS. 9, 10 and 11. FIG. 13 shows how FIGS. 9, 10, 11 and 12 may be placed to most advantageously illustrate their interrelationships.

The sequencer 16 provides the timing functions for testing the matrix and the gating functions for sending the multi-frequency tones to the CAMA center 6 via the trunk T2, R2 (FIG. 1). The sequencer start and various other functions, are controlled by the miscellaneous relay circuit 12. Once started, the sequencer retains control until the identification is complete.

The sequencer basically consists of five kinds of circuits mounted on printed circuit cards: a binary counter card 900, a control card 901, a decoder gate card 1100, an inverter gate card 1001, and a card 1109 bearing diode gates. The form and function of these cards will generally be understood from the following discussion.

Each time a group of digit gates is closed by the sequencer, a check now (CKN) lead is marked to the check and alarm circuit 30. Then, that circuit begins a 20 millisecond "no-detect" interrogation period. Each detector 26 has an input into the check and alarm circuit 30 which is marked when a detection has been made. Since the detect time is about 15 milliseconds, the detector normally marks the check and alarm circuit in time to appease the "no-detect" interrogation period. On the other hand, if a normal detector does not operate within 20 milliseconds, the check and alarm circuit marks a "dump" lead (D) which extends to the miscellaneous relay circuit.

The binary counter 900 provides the time sequences affording opportunities to read out the individual digits of a directory number, and the decoder 1100 gates N11 through N23 gate, in the proper sequence, the outputs of the binary counter. Specifically, the sequential operation of the decoder gates allows the readout of the subscribers' thousands digit, the transmission of the key or start pulse KP signal, class of call digit, office code digits A, B and C, thousands, hundreds, tens, and units digits and the stop or ST signal—in that order. The gates for accomplishing these functions are so labeled at 1100.

A test of the calling subscribers' thousands digit is necessary, since this digit allows a call to be screened to determine whether it is to be a regularly processed ANI call or an ONI call. The gating of the start or KP signal prepares the ticketing equipment for the information that is to follow, i.e. the class of call, office code, thousands, hundreds, tens and units digits, the stop or ST signal, and reset.

The decoder gates 1100 are arranged so that normally at least one ground signal is applied to at least one input of each gate. The gates are designed so that when a ground appears on any one input of any one gate, a transistor (not shown), inside the gate turns on to apply approximately −12 v. D.C. at the output terminal. When all the inputs of any one gate are connected to −12 v. D.C., transistor gate turns off and ground is applied thru a resistor at the output terminal. For example, if ground appears at any of the inputs 1102, a −12 volts signal appears at output 1106; or, if all of the inputs 1102 are at −12 volts, a resistive ground appears at the output 1106.

When a demand is put on the sequencer, the binary counter 900 steps to apply a −12 v. D.C. signal on all of the inputs of the various gates 1100 in the proper sequence. For example, all the inputs of gate N11 first go to −12 volts. Then, after a time period, ground appears on at least one input of the gate N11 and all of the inputs of gate N12 go to −12 volts and so on until all the inputs of gate N23 go to the −12 volts, at which time the binary counter 900 is reset and ready to accept another demand.

The gates 1100 work in conjunction with a common control circuit 901. For a thousands test, the output 1106 of gate N11 is connected to an input 903 of a NOR gate N4 that is connected to a common driver 1200 for the thousands matrix digit gate. All of the thousands gates are inhibited when the driver 1200 is on and enabled when the driver is off. When the output of Gate N11 goes to ground, the following takes place: (1) the NOR gate N4 operates and puts out −12 volts at its output, (2) the output of the NOR Gate N4 operates a lamp and relay or LRA amplifier 904 and (3) Gate N4 turns off the common drive circuit for thousands matrix digit gates—thereby preparing them to operate, but no tones are transmitted at this time since the inhibit has not been removed from the relay drivers.

The output 1107 of start Gate N12 is connected to the particular ones the diode gates 1109 which are here numbered 1110, 1112. When the output of the start gate N12 goes to ground the following takes place: (1) ground is supplied to inverter circuit 1001 to remove the inhibit from the relay driver 1003, (2) ground is supplied the relay driver 1003 gate circuits thru 1112 to operate the appropriate MF tone for the KP signal.

Figure 7:
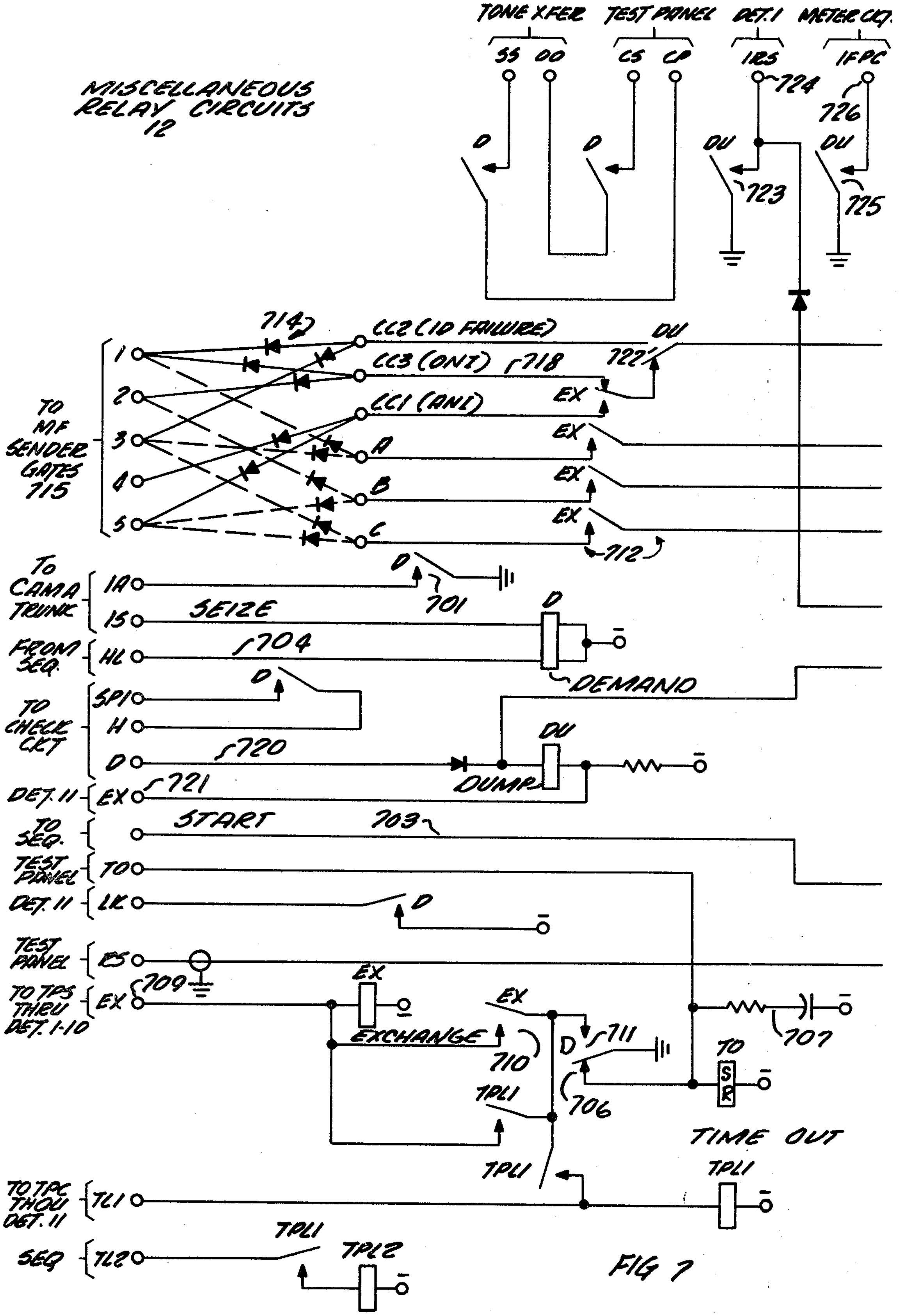
FIG. 7 and FIG. 8 are detailed diagrams showing preferred circuits for a miscellaneous relay circuit of use in the practice of the invention.
Figure 8:
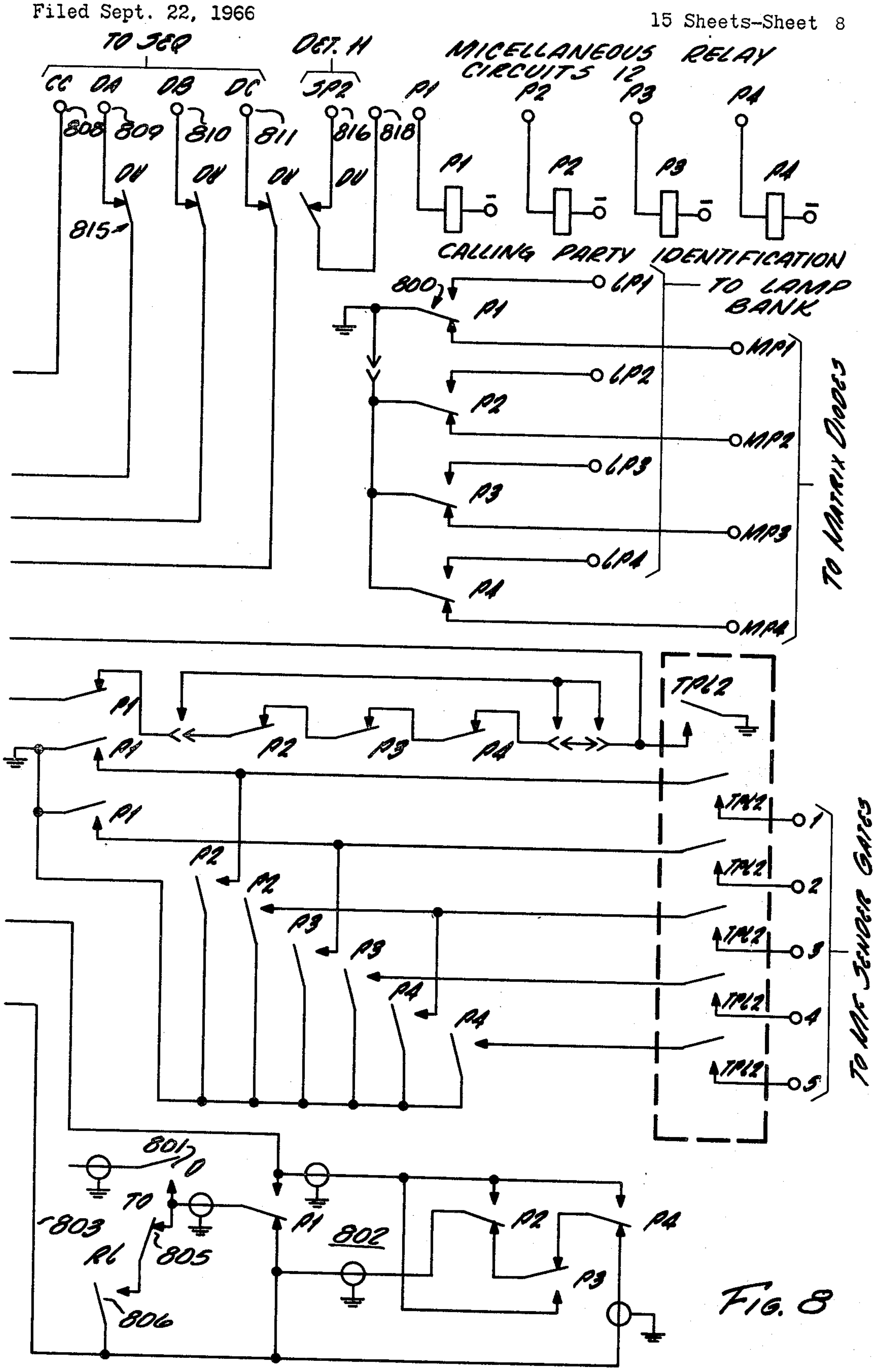

When the output of N13 class of call gate goes to ground the following takes place: (1) same as that for N12 (1), (2) the output of N13 is connected over terminal CC to the miscellaneous relay circuit (FIGS. 7 and 8). This ground goes thru the miscellaneous relay circuit and is fed back to the relay driver 1003 to allow the relay driver to operate as soon as the inhibit is removed.

The operation of Gates N14, N15 and N16 are identical to that of Gate N13.

The output of Gate N17 is connected to the diode gate at 1118 and to the control card at 906. When the output of Gate N17 goes to ground, the following takes place: (1) the same as for Gate N11 in (1) above, (2) the same as in (1) for Gate N12, (3) the output of gate N17 is also connected at 906 to an input of another NOR gate N3 on the control card. A ground on an input of this gate N3 allows it to operate and put −12 volts at its output 907 for operating the lamp and relay LRA amplifier 904 and changing the speed of the variable speed clock 909.

The output of Gate N18 is connected to the control card and to the inverter card. When the output of Gate N18 goes to ground, the following takes place: (1) same as for Gate N17 in (3) above, (2) the output ground of Gate N18 operates an inverter 1010 on the inverter card 1001. When the inverter operates, its output goes to −12 volts which is applied to the common control gate 1201 of the hundred matrix digit gate 1202. The common control gate 1201 operates, and its output goes to ground which removes the inhibit from the digit gates and 1202 allows them to operate.

The operation of gates N19 and N20 is the same as the operation of the gate N18 with the exception that gate N19 controls the tens matrix digit gate 1203 and gate N20 controls the units matrix digit gate 1204.

Gates N21 and N22 control the stop or ST signal and their operation is similar to the operation of the gate N12. Gate N22 operates directly behind gate N21 to produce a pulse having a 120 ms. duration.

The output of reset gate N23 is connected to gates N2, N5 on the control card 901. The NOR gate N2 is part of a circuit for enabling the clock 909 which drives the binary counter 900. The NOR gate N5 resets the binary counter 900 to its zero position.

The relay driver circuit 1003 is designated to provide a near ground output when appropriate input conditions are satisfied. The output in a preferred embodiment can supply enough current to drive a relay coil of 1000 ohms, or greater, with coil voltages that vary from −44 to −56 volts. For the relay driver to supply an output signal, two input conditions must be met. An enable lead 1011 must supply −12 volts and one of the input leads 1012 must be at ground potential. In a preferred embodiment, the input circuit consists of a NPN silicon transistor and associated biasing resistors (not shown). The emitters are multiplied and brought out to the enable lead. The bases are connected to the individual leads 1012. If the inputs are either open or have a negative (−12 or greater) potential applied, the transistor circuit is reverse biased whether the enable lead is at ground or −12 volts. However, if one of the input leads 1012 goes to ground (through a resistor of no greater than 20K), the corresponding transistor turns on and saturates. The collector of the input stage will then go from ground, through a resistor, to a source of approximately −12 volts. This −12 volt source is coupled, by a current limiting resistor, to the base of the output transistor causing it to saturate and provide the near ground signal to the MF Sender relay.

The matrix digit gates, as illustrated in FIG. 12 (such as 1202), provide buffer stages between the output of the subscriber number matrix and the detector circuits. Each of these gates exhibits an input impedance of about 1.0K and a voltage gain of less than unity. 11 individual gate circuits and their common driver (such as 1201) comprise the circuit of a printed circuit board. Each printed circuit board is intended to be used with a decade in the numbering scheme; therefore, four matrix digit gate circuits accommodates 10,000 numbers. One gate circuit board accommodates the unit digits (0–9), another the tens digits (10–99), a third the hundred digits (100–999), and the fourth the thousands digits (1000–9999). The output of the driver circuit, on each printed circuit board, is brought out and is used, in the case of the unit digits, to energize a relay driver circuit which operates the TPL 2 relay in the miscellaneous relay circuit.

DETECTOR

Figure 14:
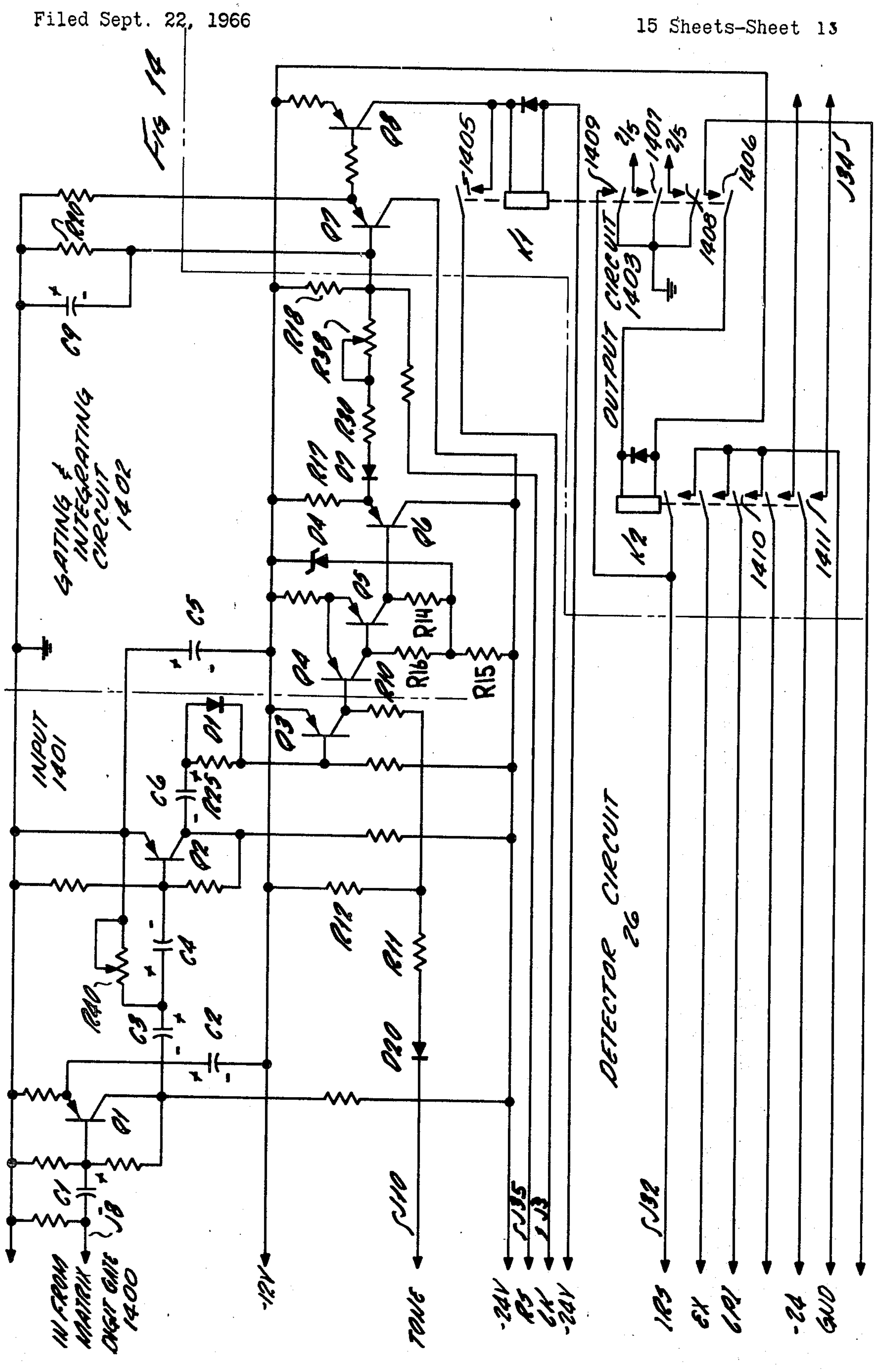
FIG. 14 is a diagram showing a preferred embodiment of an exemplary detector circuit.

FIG. 14 shows, in detail, an exemplary circuit used as a detector of the A.C. tone signals. Each system is equipped with ten identical such detectors, block 26, FIG. 1. A circuit input lead 1400 is connected to one of the number busses in the four bus groups of the matrix, the connection being made through a corresponding one of the four groups of digit matrix gates as at 1400 in FIG. 12 (also shown at 24 in FIG. 1). The detector outputs are permanently wired to an electromagnetic control circuit for converting the detection number into a 2-out-of-5 code scheme.

The detector circuit of FIG. 14 may be divided into three sections: a detection or input section 1401 consisting of a jack J8 and transistors Q1, Q2 and Q3; a gating and integrating section 1402 consisting of jack J10, transistors Q4, Q5, Q6 and capacitor C9; and an output section 1403 consisting of transistor Q7, Q8 and relays K1 and K2.

First, consider the detector input section 1401 in a "no-signal-input" condition. Transistors Q1 and Q2 are identically biased for class A amplification and are in their conducting mode. The base of transistor Q3 is biased negatively; hence, the transistor Q3 is also conducting.

When the identifier is required to identify a line, an A.C. tone signal appears on the sleeve of that line (contacts 320, FIG. 3), finds its way through a resistor matrix, and is gated by a sequencer through a digit gate to the detector input jack J8 at 1400. The signal thus fed in a jack J8 is applied through the capacitor coupling C1 to the base of the first amplifier stage transistor Q1. The amplified signal is then fed from the collector of transistor Q1, through coupling capacitors C3 and C4 into the base of the second amplifier stage Q2. A gain adjustment may be made in the second stage by shunting more or less current around the transistor Q2 by means of potentiometer R40. When potentiometer R40 is adjusted for zero ohms, no signal is fed to the base of transistor Q2, and when it is adjusted for maximum resistance the maximum signal current flows to transistor Q2. The output of transistor Q2 is fed through a coupling capacitor C6 as alternating current. During the negative half cycle, no great change occurs at the base of the transistor Q3 because of the IR drop across a large resistor R25; however, during the positive half cycle, the diode D1 conducts a heavy current and drives the base of transistor Q3 to a positive voltage, thus shutting it off.

Turn now to the gating and integrating section 1402. A full tone signal is fed-in continuously at J10 when the identifier is receiving the A.C. tone sent over the sleeve of a line which is to be identified. This tone is half-wave rectified through diode D20 which allows only the negative half-cycles to reach the resistor voltage divider R11 and the combination R10, R12, in parallel.

When the circuit has no A.C. tone signal input at the jack J8, the transistor Q3 conduits. The control signal fed in at jack J10 flows through the transistor Q3, which is conducting, and the control signal does not affect the transistor Q4. Since the transistor Q4 is not conducting, the transistor Q5 is biased into conduction. A Zener diode D4 acts as a voltage regulator and maintains a voltage of about −8.2 volts at the junctions of the resistors R14, R15 and R16. The potential at the base of transistor Q6 is not sufficiently negative relative to the emitter to cause the transistor Q6 to conduct. Since the transistor Q6 is off, the capacitor C9 is isolated, and the base of transistor Q7 cannot receive a negative current. Instead, the base of transistor Q7 is biased positive by the voltage divider action of the resistors R20 and R18 in parallel with the resistors R38, R30, diode D7 and resistor R17. Reviewing, we have the following conditions:

No A.C. tone signal at J8:

Transistors:

| | |
|---|---|
| Q3 | On. |
| Q4 | Off. |
| Q5 | On. |
| Q6 | Off. |
| Q7 | Do. |

Let us next consider how the circuit responds when a positive half-cycle A.C. tone signal is fed in at J8 and a negative half-cycle of the control tone is fed in at J10 Transistor Q3 turns off. The negative half-cycle current cannot flow from J10 through transistor Q3, but must flow through the base and emitter of the transistor Q4, thus causing it to conduct. The transistor Q5 is then shorted out, and it shuts off, thus increasing the base potential of the transistor Q6 to nearly −8.2 volts. The transistor Q6 conducts, causing current to flow through transistor Q6, diode D7, resistors R30 and R38 to charge the capacitor C9. A single half-cycle of the central tone fed in at jack J10 does not contain enough energy to charge the capacitor C9 sufficiently to cause the transistor Q7 to conduct; however, the charge is trapped on capacitor C9 by diode D7. Succeeding half-cycle pulses received at the J10 are added or integrated increasing the charge on the capacitor C9 until the resulting potential is high enough to cause transistor Q7 to conduct.

Conduction of transistor Q7 indirectly causes external relays to operate as described below, and to place a ground potential at the jack J35. This ground discharges the capacitor C9 and effectively resets the integrator. In actual practice, the ground at jack J35 is present at all times except when the circuit is actually detecting an A.C. tone. The amount of current which flows into the capacitor C9 during every half-cycle in the control tone received at jack J10 can be controlled by an adjustment of the potentiometer R38; hence, the adjustment controls the number of half-cycle pulses required to be integrated on the capacitor C9 before the detection transistor Q7 turns on. This action effectively controls the duration of the half-cycle time period required for a complete integration. With the potentiometer R38 set at zero ohms, there is the shortest integrate time period. At maximum ohms, the integrate time period has maximum duration.

Consider next the output section of the detector circuit of FIG. 14. In its idle condition, the base of the transistor Q7 is slightly positive; therefore, neither transistor Q7 nor transistor Q8 conduct. Relays K1 and K2 are not operated.

During detection, the base of transistor Q7 is biased into conduction by the charge stored on the capacitor C9. This causes the transistor Q8 to conduct and operate relay K1. At its contacts 1405, relay K1 locks up to −12 volts on jack J3, the −12 volts being supplied from the control circuit. Contacts 1406 operate the relay K2, while contacts 1407, 1408 send out the 2-out-of-5 ground marking code corresponding to the numerical value of the decimal number which was detected. Contacts 1409 place on jack J32 to operate various reset relays (not shown). When they operate, the reset relays ground jack J35 to cancel the charge stored on capacitor C9.

Relay K2 sends ground (through contacts 1410) to light a detector lamp LP1 and (at contacts 1411) applies a −24 volts to jack J34 which disables the 1-out-of-10 check and alarm circuit 30 (FIG. 1).

MISCELLANEOUS RELAY CIRCUIT

The miscellaneous relay circuit 12 is illustrated in detail in FIGS. 7 and 8. As previously indicated, this circuit provides the interface and control between the CAMA trunk circuit 4 and other parts of the identifier circuit. Among other functions, the relay circuit 12 stores the party digit, distinguishes between TPL and TPS calls, encodes a unit digit on TPL calls, times the access to the identifier, monitors the power supply for the printed circuit cards, and provides an alarm circuit.

The identifier is seized by the CAMA trunk circuit 4 applying ground on the IS lead 700 to the miscellaneous relay circuit 12. The demand D relay operates and closes its contacts 701 to extend ground on the IA lead to the trunk circuit 4. Ground is returned from the trunk circuit 4 to FIG. 8 to operate one of the party relays P1, P2, P3 and P4 which stores the numerical value of the calling party identification digit. These P relays close their contacts 800 in a manner which extends the calling party identification information to the identifier. Four party identification is shown in FIG. 8, but additional or fewer parties might be subject matter of this identification.

Before the party relay can operate, the D relay applies ground through its break contact 801 to a number of the party relay contacts 802 and then over wire 803 to the RS (reset) lead. This resets the sequencer 16 to insure a start of identification from a normal condition. When the party relay operates, ground is also extended through a make contact 802, the start lead 703 leading to the sequencer. This starts the sequencer clock to running which will gate out the appropriate MF signals to the CAMA center 6. When the sequencer starts, ground is extended on the HL lead 704 to the D relay, thereby placing the sequencer in control over the release of the relay circuit 12.

A time out feature should be noted in connection with the TO relay (FIG. 7). The identifier access time is controlled by the TO relay which is normally operated at contacts 706 of relay D during the idle state. When the identifier is accessed and relay D operates, contacts 706 open the operate path to the TO relay, and it releases during a delay time period controlled by an R-C circuit 707. The normal time for identification is 1.5 seconds, and the time out relay TO releases in approximately 3 seconds. Thus, by the time when the time out relay releases, the sequencer should have completed its function. In any event, it is reset when the TO relay closes its contacts 805, the contacts 806 being then closed. If identification is not then completed, an alarm relay operates, and the identifier is released from the CAMA trunk circuit 4. When it is so released and put out of service, the identifier is arranged to continue to attempt to service other calls. However, the remaining active check circuits are still operative—assuming that there has not been a catastrophic series of simultaneous failures—and they will insure a proper and accurate output from the identifier.

When the sequencer starts, it gates the thousands detector. The resulting output determines whether the call is to be handled as an ANI, ONI, identifier failure, or blocked call, described separately below.

The output of the thousands detector extends ground on the EX lead 709 to operate the EX (or Exchange) relay. Relay EX operates and locks through its own contacts 710 to a ground extended by the D relay at its contacts 711. It closes a path through its contacts 712 for sending a class of call signal and office code A, B, and C signals to be gated by the sequencer over conductors 808, 809, 810, 811, respectively, through contacts 712, and a diode field 714 to the MF sender, in a ⅖ code, at the output 715.

At the end of the identification routine, the sequencer 16 removes the ground from the HL lead 704, and releases the D relay. When relay D releases, contacts 701 open, and ground is removed from the IA lead, thus signalling the CAMA trunk circuit 4 to disconnect. The circuit is now ready for another identification.

An output from the 11th detector allows the class of call or CC output from the sequencer to be gated over the conductors 808 and 718 to the MF senders 14 (FIG. 1) as a CC3 ONI (or Operator Number Identification) call. Again, at the end of the sequencer controlled identification routine, ground is removed from the HL lead 704 and relay D releases, making the circuit idle.

There is a logical failure of the circuit if two or more output signals are received from the detectors 26 when the sequencer gates the thousands detector. Upon occurrence of such a failure, a ground is extended from the check and alarm circuit 30 over the D lead 720 to operate the DU (or Dump) relay. If only one detector responds to the thousands digit, there is a logically correct operation, and ground is returned over the EX conductor 721 to shunt the dump relay DU and prevent any inadvertent release of the circuit. If the dump relay DU operates, its contacts 722 gate out an identifier failure to the MF sender gates 715, contacts 723 extend ground to detector 1 on the IRS lead 724. Contacts 725 apply ground on the identifier failure peg count lead 726. Contacts 815 open the digit gate leads 809–811 for blocking a transmission of the office code and for preventing blocking of a call if the detector 11 is functioning.

However, the sequencer continues its operation and the call is identified by the operator as an ONI call.

When detector 11 and any of the ten detectors 26 operate there has been a logical failure. A ground is extended on the SP2 lead 816 thru the DU break contact to the CAMA trunk circuit 4 via lead 818. The trunk circuit 4 drops the calling subscriber into line lockout and releases the identifier. On release, a party relay releases the contacts 802 and applies a reset over conductor 803 to the sequencer.

CHECK AND ALARM CIRCUIT

Figure 15:
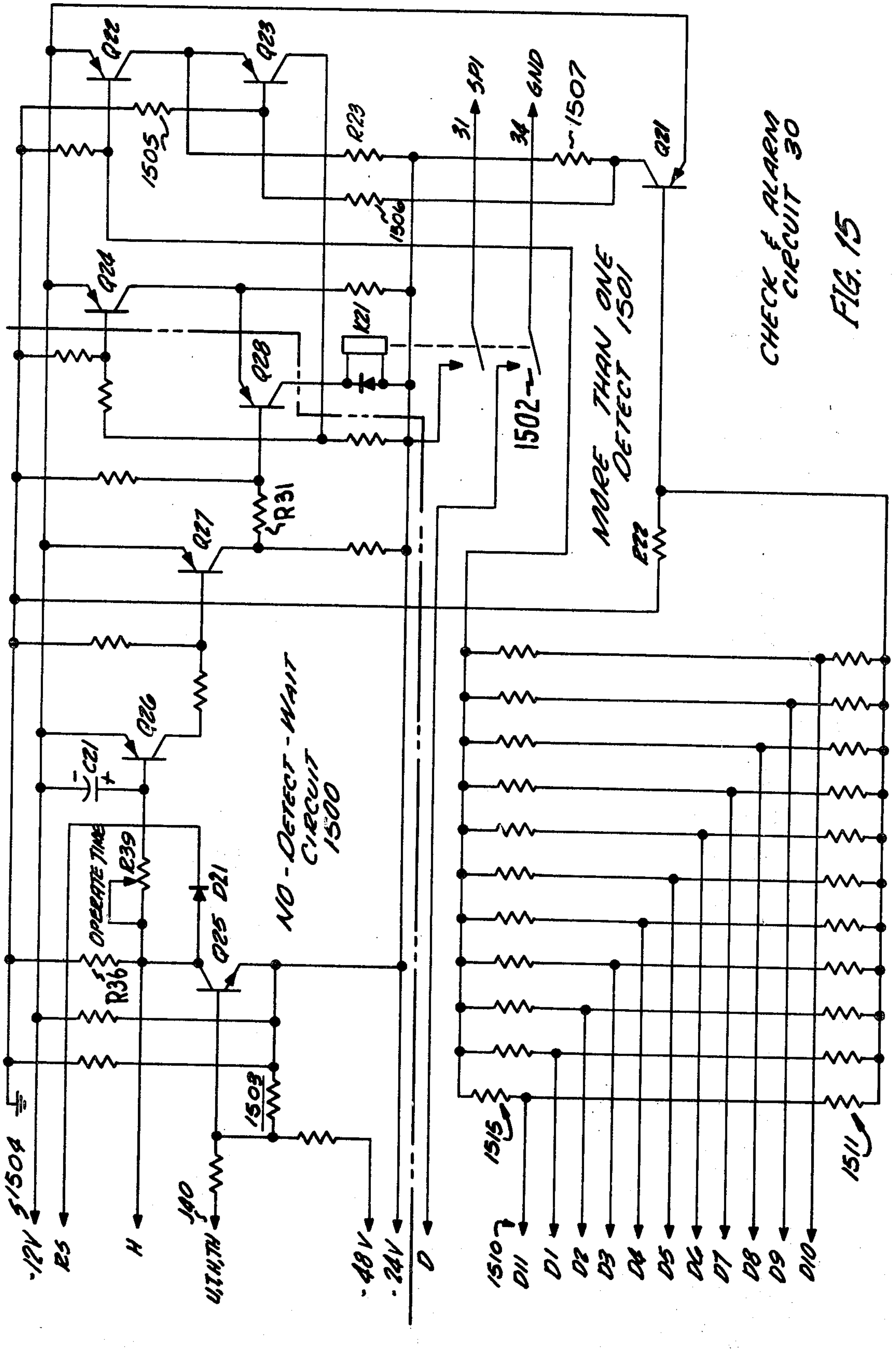
FIG. 15 shows relationships between typical arrangements of a check and alarm circuit.

The check and alarm circuit is shown as block 30 in FIG. 1, and an embodiment is shown in detail in FIG. 15. It is an electronic circuit which indicates when an improper detection has been made, as when more or less than one detector operates responsive to a digit of the calling number. If more or less than one detector operates, the check and alarm circuit of FIG. 15 marks ground on the D, or dump lead. Responsive to this marking, the telephone call is routed to an operator for her personal supervision. The check and alarm circuit along with the miscellaneous relay circuit also determines the class of call by analyzing the number of detector inputs. An ANI (Automatic Number Identification) is indicated when only one of 1–10 detectors is operated, ONI is indicated when only detector 11 is operated, IF (identifier failure) is indicated when two of 1 thru 10 or no detectors operate, and the call is blocked when detector 11 and any 1 of 10 are operated.

A "no-detect" failure occurs when the check and alarm circuit 30 waits for 20 milliseconds without receiving a proper signal. The detectors are adjusted for a 15 millisecond operate time; hence, the waiting time is long enough to insure that a detection will be accomplished if one is to occur. If a detector does operate properly within the "no-detect" waiting period, it disables the check and alarm circuit 30 so that it cannot mark the D lead; otherwise, it does so mark the D lead. Basically, the alarm and check circuit 30 is made up of two sections. The no-detect-wait section 1500 includes the equipment involving jack J40, transistors Q25, Q26, Q27 and Q28, and the more-than-one detect section 1501 includes the remaining apparatus.

As can be seen, when relay K21 operates the contacts 1502 ground marks the D lead to indicate that a faulty detection has occurred. This relay is operated under the control of two series connected transistors Q24 and Q28. In the normal condition, no signals are fed into the check and alarm circuit 30 and the following transistor and relay conditions exist.

Transistors:

| | |
|---|---|
| Q21 | Off. |
| Q22 | Do. |
| Q23 | Do. |
| Q24 | On. |
| Q25 | Off. |
| Q26 | Do. |
| Q27 | On. |
| Q28 | Off. |
| Relay K21 | Non-operated. |

Next, consider the "no-detect-wait" section 1500 of the circuit in its idle condition. The transistor Q25 is not conducting due to a negative back bias of a −48 volts voltage divider network 1503. Current flows from a −12 volt supply 1504 through capacitor C21, potentiometer R39, diode D21 and the reset conductor RS to ground, thereby charging capacitor C21. When the capacitor C21 is charged sufficiently, the base of transistor Q26 is positive relative to its emitter, and the transmitter is turned off. The collector of the transistor Q25 is also at a relatively positive potential.

At the instant when a digit gate circuit turns on to connect a detector to the matrix, −12 volts is placed on jack J40. This −12 volts upsets the voltage division of the network 1503 and causes the transistor Q25 to conduct. Now, the load current of the transistor Q25 flows through resistor R36 and potentiometer R39 to charge capacitor C21 to −12 volts. Potentiometer R39 is adjusted so that 20 milliseconds after −12 volts is placed on jack J40, the capacitor C21 is charged negatively to a potential which is high enough to cause the transistor Q26 to conduct. This action changes the bias on the base of the transistor Q27 which turns off. The transistor Q28 turns on to conduct current to the relay K21 which then operates over a circuit through the transistors Q28 and Q24, in series. −12 volts is sent through contacts 1502 to the dump lead D. When −12 volts is removed from jack J40, the transistor Q25 is shut off, and capacitor C21 is quickly charged positive voltage, as explained above. Transistor Q26 turns off; transistor Q27 turns on; transistor Q28 turns off, and relay K21 releases.

Let us next consider the more-than-one detect section 1501, and more particularly how the transistor Q23 behaves when the circuit is idle. Transistor Q21 is off; hence, the base of transistor Q23 is biased at a negative-to-ground potential set by the voltage divider 1505–1507, but the base-to-emitter current cannot flow through the transistor Q23 because of the biasing voltage applied through resistor R23 when the transistor Q22 is not conducting.

When a single detector operates, it places −24 volts on the corresponding diode lead terminal D1, D2 . . . D10 (1510). A negative potential on one of these leads is applied through one of the resistors 1511 and causes the base of transistor Q21 to fall from ground, but it still remains positive relative to the emitter, and transistor Q21 does not conduct. However, the base of transistor Q22 is driven negative by a voltage applied through one of the resistors 1515; hence, transistor Q22 conducts, thus causing the transistor Q23 to conduct also. With transistor Q23 conducting, the base of transistor Q24 goes positive causing it to shut off. Under these circumstances, the relay K21 cannot operate, contacts 1502 do not close, and the circuit is unable to mark the dump lead D.

When two detectors operate simultaneously, a −24 v. potential is fed in at two separate ones of the leads 1510. In a preferred embodiment, this parallels two 3900 ohm resistors at 1511 and at 1515 to negatively bias the bases of transistors Q21 and Q22; hence, they conduct simultaneously. By voltage divider action, the base of transistor Q23 is made positive, and it does not conduct. Since transistor Q23 is off, the transistor Q24 continues conducting. After a 20 millisecond period, the transistor Q28 also conducts; hence, relay K21 operates its contacts 1502, thus marking the dump lead D.

TRANSFER, ALARM AND RESET CIRCUIT

Figure 16:
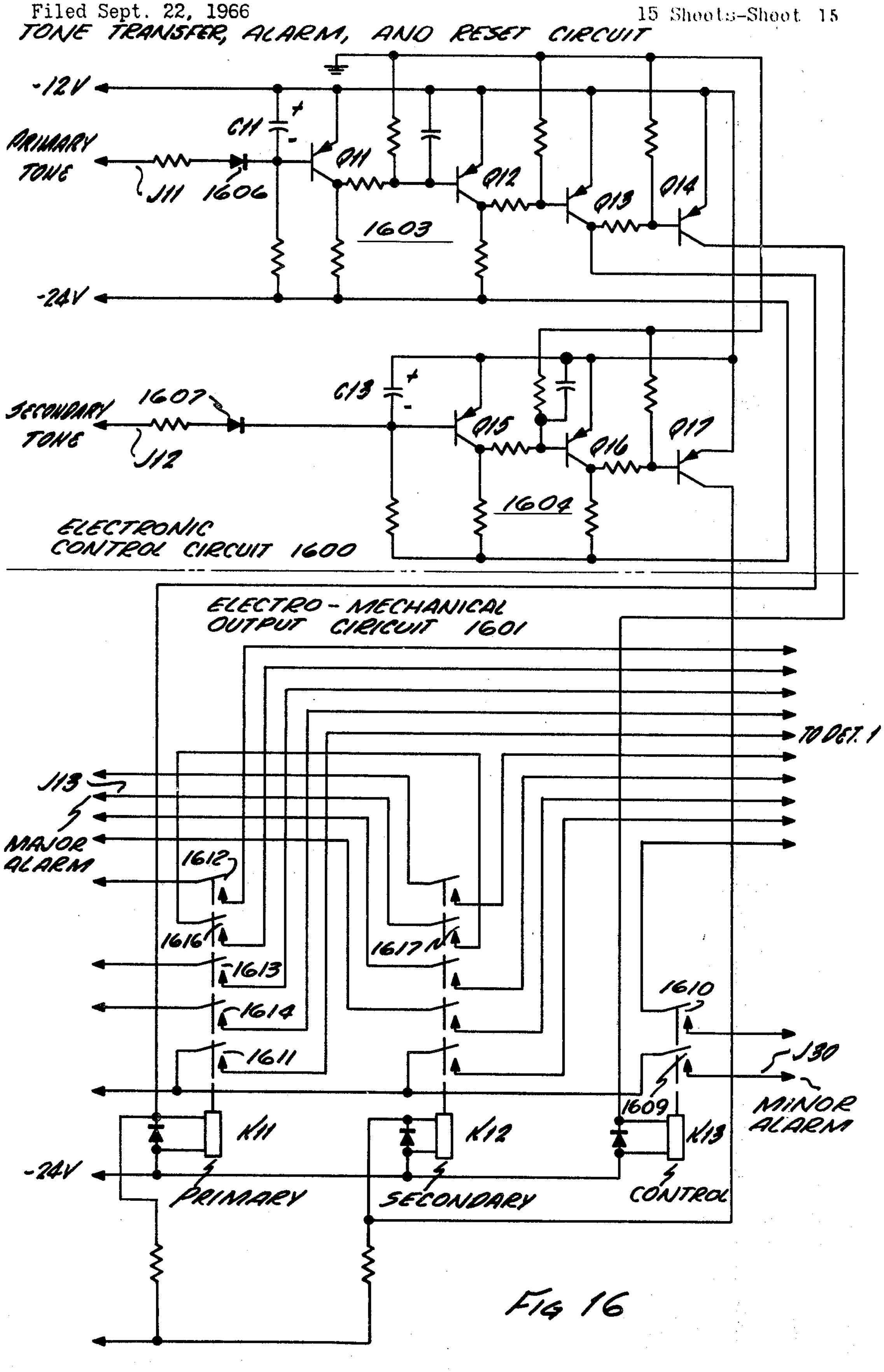
FIG. 16 illustrates an embodiment of an exemplary tone transfer, alarm and reset circuit.

Next to be described is the transfer, alarm and reset circuit (FIG. 16) which monitors the tone generators 10. Primary and secondary oscillators are provided. Normally, these oscillators operate together, either may operate alone to supply the tones if the other encounters trouble.

The tone generator 10 provides an output having approximately 900 c.p.s. with a nominal 60 volts, peak-to-peak. This tone is applied to the subscribers sleeve when the CAMA trunk circuit 4 accesses the identifier. The oscillator has two modes of operation; one in the idle condition and one in load condition. The identifier is also arranged for an optional standby oscillator to which it will automatically transfer should the primary oscillator fail. The tone generator may be of conventional design. The circuit of FIG. 16 has two sections, one 1600 is an electronic control and the other 1601 is an electromagnetic output. The electronic circuit 1600 provides transfer and alarm functions primarily by monitoring the two tone oscillators for tone failure. The electromechanical circuit 1601 is provided to control reset and transfer the detector circuits. Their purpose is to automatically transfer outputs in a way such that tone is provided as long as either or both oscillators are functioning properly. They provide a minor alarm if one tone generator fails and a major alarm if both generators fail. These alarms may be sent directly into the central office alarm system in any suitable manner.

The electronic circuit 1600 consists of two quite similar, but entirely independent, circuits 1603, 1604, and the following explanation will apply generally to both sections—with the exception of relay K13 and the transistor Q14. An input A.C. tone signal of about 40 volts peak-to-peak is normally applied at jacks J11 and J12. One tone source normally supplies identification tone to the sleeve and the other normally supplies the control tone. The diodes 1606, 1607 rectify the A.C. input tone currents and charge the capacitors C11 and C13 to a positive potential which biases the transistors Q11 and Q15 to an off condition.

The following conditions then exist under normal conditions:

| | |
|---|---|
| Transistors: | |
| Q11 or Q15 | Off. |
| Q12 or Q16 | On. |
| Q13 or Q17 | Off. |
| Q14 | On. |
| Relays: | |
| K11 or K12 | Off. |
| K13 | On. |

in which transistors Q11, Q12, Q13 and Q14, and relays K11 and K13 are related to the primary tone generator and transistors Q15, Q16, Q17 and relay K12 are related to the secondary tone generator.

It will be noted that the relays K11 and K12 are not operated as long as the primary tone generator is functioning properly because their operating current must flow through the transistors Q13, Q17 which are normally off. Relay K13 is normally operated because its current flows through the transistor Q14 which is normally on. The contacts 1609 control the oscillators by causing them to put out a normal tone during normal operating conditions. The contacts 1610 cause the oscillators to put out their tone in either of two ways depending upon the instantaneous loading conditions.

At some input voltage, perhaps between 20 and 30 volts peak-to-peak, the half-cycle current fed through diode 1606 and into capacitor C11 (C12 for the secondary tone supply) is no longer sufficient to bias the base of the transistor Q11 (Q15) positive relative to the emitter, and the transistor Q11 then conducts. There upon, the following conditions exist, to indicate that a failure has occurred in the primary tone source:

| | |
|---|---|
| Transistors: | |
| Q11 | On |
| Q12 | Off |
| Q13 | On |
| Q14 | Off |
| Relay K13 | Off |
| Relay K11 | On |

When relay K13 releases its contacts 1610, a tone transfer relay (not shown) releases in the associated equipment group to switch over and place the primary generator load onto the secondary tone generator. Relay K11 operates its contacts 1611 to signal an alarm condition; contacts 1612 light a primary tone failure lamp; contacts 1613, 1614 affords miscellaneous connections for the various transfers.

If the secondary tone generator fails, relay K12 operates, gives an alarm, and transfers the tone loads in a manner which should be obvious from the operation of the relay K11.

If both generators fail, both of the relays K11 and K12 operate, and a major alarm is sent through contacts 1616, 1617 and jack J13. The associated equipment may respond to the major alarm in any known manner. Thereafter, the personnel in the office will take appropriate action to correct the faulty condition.

RÉSUMÉ

In order to enable the reader to gain a better understanding of the invention, the following presents a brief review of a preferred embodiment, as it pertains chiefly to ANI calls.

The subscriber goes off-hook and dials the trunk access digit. The CAMA trunk circuit 4 is seized over the T1 and R1 lines. On seizure, the L, H and AH (FIG. 4) relays operate.

If the scheme for party identification uses the well known circle digit approach, the subscriber dials a digit which identifies his station. (The name "circle digit" comes from the practice of printing this digit on a number card located in the center of his dial.) On the first dial break of the circle digit, the seize S relay operates, and it then holds over the dial pulses because it is slow release. The circle digit relay CD operates when the S relay operates, but the CDA does not operate until the S relay releases. This arrangement allows the counting chain 310 to store the first dialled digit for later presentation to the identifier. At the end of the digit, the S relay releases, the CDA relay operates in series with relay CD for preventing later sent additional digits from advancing the counting chain.

The subscriber continues to dial the area code and called number. On completion, the (CAMA) toll center 6 returns answer supervision to the trunk 4. This answer supervision operates the E relay and its slave EA. The E relay closes the DI (demand in) lead, thus extending ground to the identifier guard circuit 8. If the identifier is not in use, an associated T relay in the identifier access guard circuit 8 will operate. Ground is extended to operate the GT (Guard Trunk) relay. The GT relay, in turn, extends ground through the operated T relay contacts and the DO (demand out) lead to the CAMA trunk circuit 4. Ground on the DO lead operates the DO relay in the trunk circuit 4. The DO lead connects the trunk to the common highway connected to the identifier. Then, the calling party identification information is transferred and the subscriber's sleeve lead S is connected to the tone generator 10.

The DO relay introduces the signal onto the sleeve lead S by transferring the sleeve from direct ground to ground applied through a 2 ohm, tone transformer. The A.C. tone signal then travels from the trunk circuit throughout the office on the calling sleeve to the subscriber's sleeve appearance on the MDF and then to the ANI matrix bay. The tone is continuously applied for 1.5 seconds, after which the sleeve is returned to normal.

On seizure of the identifier, the D relay operates in the miscellaneous relay circuit 12. A reset is sent to the sequencer to insure that the identifier is clear before read out. Then, the P relay operates, and a start signal is applied to the sequencer on the KP lead. The sequencer starts and returns a hold ground on the HL lead to hold the D relay. When the D relay operates, ground is returned to the trunk circuit 4 on the LA lead, operating the IB relay. This causes the trunk circuit to transfer control of the D relay to the sequencer.

The sequencer first requests the exchange (EX) mark. This X is accomplished by grounding the common (TH) thousand gate group lead, extending a (LK) lock lead and removing the (RS) reset ground from the detectors by releasing the reset relays. The (TH) gate group closes the 11 detectors to the 11 matrix, output digit busses, and marks a (CKN) check-now lead to the check and alarm circuit. The (LK) lead gives a lock path so that the detector circuit that operates can lock up until the common equipment removes the information.

Each detector has its exchange (EX) lead commoned to the operating circuit of the exchange relay located in the miscellaneous relay circuit. If the office is TPL, the exchange (EX) lead is connected to the TPL relay. If the office is a TPS office, a detector output applies ground to operate the EX relay. The EX relay operates and closes paths for gating the CC (Class of Call) DA, DB and DC (Digits ABC of office code) which are sequentially gated out by the sequencer.

Next, the sequencer again strobes the matrix for the thousands, hundreds, tens, and units output of the subscribers number. These numbers are gated out on the T2 and R2 leads as MF signals to the CAMA toll center 6. On completion, the sequencer resets itself and removes ground from the HL lead, and the D relay releases. When the D relay releases, it removes ground from the LA lead going to the trunk circuit 4. This allows the IC relay to operate. This IC relay operation breaks the DI lead to the ID access guard which releases the T relay. The T releases the GT relay and removes ground from the DI lead causing the DO relay to release. The DO relay releases and removes all connections to the identifier and cuts through the various tip and ring (T and R) leads to the CAMA toll center 6. Supervision of the trunk is controlled by the CAMA toll center after answer is received.

The class of call is determined by action in the check circuit 30, detectors 26, and the miscellaneous relay circuit 12 (all shown in FIG. 1). The function of the check circuit is to determine when more than one or when no detectors are operated. When only one of the detectors 1–10 operates, ground is extended on the EX lead to operate the EX relay (FIG. 7). As the sequencer steps the CC (Class of Call) is gated out and the ANI, DA, DB and DC signals are gated out according to the manner in which the office code is strapped.

The ONI or Operator Number Identification signal is generated when only detector 11 operates. When it operates, the detector 11 extends ground to shut down relay DU. When CC is gated from the sequencer neither DU or EX relay is operated, the call is then gated out as ONI. A, B, or C will not be gated.

An IF or Identifier Failure results when more than one of the detectors 1–10 operate. The check circuit detects this multiple operation and extends ground to operate the DU relay. When the sequencer steps to CC, the call is gated as IF. The A, B and C digits are not gated.

A blocked call is generated when detector 11 and any detector 1–10 is operated. Ground is extended by the check circuit to operate the DU relay and to detector 11. Since detector 11 is operated, relay DU does not operate, and the ground from the check circuit is extended to the trunk which drops the subscriber into line lockout.

While the principles of the invention have been described above in connection with specific apparatus and applications, it is to be understood that this description is made only by way of example and not as a limitation on the scope of the invention.

What is claimed is:

1. A circuit for determining the identity of a calling subscriber and establishing the subscriber's identity with a toll center comprising means including a trunk responsive to an incoming call from a subscriber for calling a toll center, means for providing a tone in response to a signal from said toll center indicating the toll center has accepted the call and is available to receive signals identifying the caller, means for transmitting said tone to a subscriber identification circuit, means responsive to determination of the subscriber number in said subscriber identification circuit for pulsing said number out to the toll center, the subscriber identification circuit including a resistor matrix incorporating an individual resistor circuit for each calling subscriber, gating means responsive to signals from said matrix, and sequencing signals for providing outputs indicative of individual digits of the calling subscriber's number, a detector for providing signals to indicate each of said digits, a multi-frequency signal generating and transmitting circuit responsive to signals from the detector to transmit paired tones indicating each of said digits, and relay circuits coupled to said trunk and responsive to signals from said trunk for transmitting control signals to the multi-frequency sender and to a sequencer.

2. A circuit substantially as claimed in claim 1 in which the sequencer includes means responsive to a start signal from the relay circuits for starting a plurality of logic circuits, said logic circuits generating sequential output pulses, and means coupling said sequential output pulses to the digit gates, the detector, the multi-frequency sender, and the relay circuits for controlling their operation.

3. A circuit substantially as claimed in claim 1 including means for checking the presence of signals in said detector for a prescribed period, said means, together with the relay circuits, determining the class of call, and said relay circuits providing class of call and failure signals to the sequencer.

4. A circuit for determining the identity of a calling subscriber and transmitting signals indicating the identity of the subscriber to a toll center, comprising a toll trunk, means responsive to a trunk access digit from a calling subscriber for seizing said trunk, means, including a counting chain, responsive to a party identification digit for storing said digit for later usage, means for preventing additional digits from advancing the counting chain, means for transmitting additional digits representing area code and a called number to a toll center, means responsive to a signal from the toll center for accessing an available identifier, means for generating a tone signal, means for introducing the tone signal to the sleeve conductor of the calling subscriber's line and over the sleeve to a matrix bay, and means responsive to the tone signal for generating and for transmitting signals indicating the identity of the calling subscriber.

5. A circuit as claimed in claim 4, in which the means responsive to a trunk access digit for seizing a trunk includes a first trunk relay, and a plurality of other trunk relays including one responsive to a signal through the first trunk relay for placing a busy signal on the first trunk relay, and for placing a demand signal to lock an idle trunk to an idle identifier until identification is complete.

6. A circuit as claimed in claim 4 in which the means for storing said digit is coupled to means for inhibiting the transmission of the party identification digit beyond the counting chain.

7. A circuit as claimed in claim 4, in which the means for generating signals indicating the identity of the calling subscriber includes a resistor matrix, means in the matrix responsive to the tone signal for providing an output over thousands, hundreds, tens and units terminals to corresponding digit gates, a plurality of binary logic devices, means responsive to signals from the binary logic devices and from said digit gates for providing signals in a 2-out-of-5 code, and means responsive to signals including the 2-out-of-5 code signals for transmitting the calling subscriber's identification number to a toll center.

8. A circuit as claimed in claim 7, in which the binary logic devices include a sequencer, and relay circuits for controlling the digit gates, the detector and the multi-frequency sender.

9. A circuit as claimed in claim 8 in which the sequencer includes a plurality of logic circuits, means responsive to a start signal from the relay for starting the plurality of logic circuits, said logic circuits generating sequential output pulses, and means coupling said sequential output pulses to the digit gates, the detector, the multi-frequency sender, and the miscellaneous relay for controlling their operation.

10. A circuit as claimed in claim 8 including means for checking the detector for the presence of signals during a prescribed period, said means for checking together with the miscellaneous relay circuit determining the class of call, and said relay circuits providing class of call and failure signals to the sequencer.

11. A circuit as claimed in claim 8 in which the sequencer includes starting means responsive to a start signal from the relay circuits, a clock for supplying timing pulses, a binary counter for providing a plurality of output signals over a plurality of terminals, and a decoder for receiving said output over a plurality of terminals, said decoder supplying control signals to the digit gates and to the multi-frequency sender.

12. A circuit as claimed in claim 11, in which the decoder includes a plurality of NOR gates responsive to inverted signals from the binary counter for producing control signals in a prescribed sequence, said control signals including signals from a thousands test gate to provide a signal to turn off the drive for the thousands matrix digit gates allowing them to operate a KP gate to provide a start pulse, and a class of call gate to provide a class of call signal to the relay circuits.

13. An identifier for detecting the identity of a calling telephone subscriber comprising means for applying an A.C. tone to a sleeve lead for identifying a line used by said subscriber, a resistor matrix having an inlet coupled through a unidirectional device to receive the tone signals applied to the sleeve lead of the subscriber line, a plurality of resistors coupled between said unidirectional device and outlets of said matrix which are selected to provide a numerical identification of the inlet associated with said unidirectional device, tone responsive means associated with said outlets for indicating the numerical identification of the outlets where said tone appears, and a multifrequency sender for providing a plurality of dual-frequency signals to indicate the numerical identification.

14. The identifier of claim 13 wherein said sleeve is coupled to a plurality of said inlets, there being one of said unidirectional devices at each of said inlets, and said plurality of resistors being coupled from each of said inlets in combinations which are selected to provide a numerical identification for each of said inlets.

15. An identifier for detecting the identity of a calling telephone subscriber comprising means for applying an A.C. tone to a sleeve lead for identifying a line used by said subscriber, a resistor matrix having an inlet coupled through a unidirectional device to receive the tone signals applied to the sleeve lead of the subscriber line, a plurality of resistors coupled between said unidirectional device and outlets of said matrix which are selected to provide a numerical identification of the inlet associated with said unidirectional device, tone responsive means associated with said outlets for indicating the numerical identification of the outlets where said tone appears, means coupling said sleeve to a plurality of said inlets, there being one of said unidirectional devices at each of said inlets, means coupling said plurality of resistors from each of said inlets in combinations which are selected to provide a numerical identification for each of said inlets, means for selectively clamping at least one side of each of said unidirectional devices to a fixed voltage to preclude passage of said tone into the associated matrix inlet, means for sequentially unclamping each of said devices one-at-a-time, thereby allowing said tone responsive means to detect the tone received from each of the inlets one-at-a-time, and means for selectively marking said sleeve during the time when a particular inlet is unclamped, thereby causing said identifier to identify said particular inlet responsive jointly to said numerical identification and the time when the tone appears in the matrix.

References Cited

UNITED STATES PATENTS

| | | |
|---|---|---|
| 2,672,518 | 3/1954 | Holden et al. |
| 2,749,387 | 6/1956 | Barlow et al. |
| 2,913,530 | 11/1959 | Bray et al. |
| 2,913,531 | 11/1959 | Adelaar et al. |
| 3,151,219 | 9/1964 | Ellis et al. |
| 3,188,395 | 6/1965 | Blashfield. |
| 3,280,268 | 10/1966 | Drake et al. |

WILLIAM C. COOPER, Primary Examiner